US007155527B2

(12) United States Patent
Kanai

(10) Patent No.: US 7,155,527 B2
(45) Date of Patent: Dec. 26, 2006

(54) STORAGE SYSTEM AND MANAGEMENT METHOD OF THE STORAGE SYSTEM ENABLING ALLOCATION OF STORAGE DEVICES

(75) Inventor: Hiroki Kanai, Odawara (JP)

(73) Assignee: Hitachi, Ltd., Tokyo (JP)

( * ) Notice: Subject to any disclaimer, the term of this patent is extended or adjusted under 35 U.S.C. 154(b) by 915 days.

(21) Appl. No.: 10/243,757

(22) Filed: Sep. 16, 2002

(65) Prior Publication Data
US 2003/0055943 A1    Mar. 20, 2003

(30) Foreign Application Priority Data
Sep. 17, 2001  (JP) ............................. 2001-281063

(51) Int. Cl.
G06F 15/16    (2006.01)
G06F 15/167    (2006.01)
(52) U.S. Cl. ....................... 709/229; 709/212
(58) Field of Classification Search ................ 709/229, 709/212, 203
See application file for complete search history.

(56) References Cited
U.S. PATENT DOCUMENTS

| | | | | |
|---|---|---|---|---|
| 4,944,678 | A | * | 7/1990 | Villette ........................ 433/224 |
| 2002/0046321 | A1 | * | 4/2002 | Kanai et al. ................ 711/113 |
| 2003/0023784 | A1 | * | 1/2003 | Matsunami et al. ........... 710/36 |
| 2004/0260875 | A1 | * | 12/2004 | Murotani et al. ............ 711/114 |
| 2005/0050240 | A1 | * | 3/2005 | Wilkins et al. ................ 710/15 |
| 2006/0031649 | A1 | * | 2/2006 | Murotani et al. ............ 711/162 |

FOREIGN PATENT DOCUMENTS

JP       11-296313       10/1999

* cited by examiner

Primary Examiner—Krisna Lim
(74) Attorney, Agent, or Firm—Mattingly, Stanger, Malur & Brundidge, P.C.

(57) ABSTRACT

The present invention enables a disk controller to make consolidated management of a great number of drives connected to a network provided within a disk subsystem and makes it possible to allocate drives to an external apparatus that needs to use some drives and connects to a network so that the external apparatus can use the drives allocated to it. The disk subsystem includes the disk controller and drives connected via a device area network and allocates one or more drives in the subsystem to an external apparatus that needs to use some drives (such as a disk controller of another disk subsystem or NAS). The external apparatus that needs to use some drives can directly connect to the above network within the subsystem. The disk controller is provided with a device allocation table and manages the allocation of the drives to external apparatuses that can use the drives. The disk controller also manages the configuration of the devices connected to the above network. The external apparatus, to which one or more drives have been allocated, directly accesses the drive or drives via the network.

14 Claims, 22 Drawing Sheets

FIG.2

3 : DEVICE CONTROL TABLE

| DEVICE IDENTIFIER | DEVICE TYPE | CAPACITY | IDENTIFIER OF THE ASSIGNED DEVICE |
|---|---|---|---|
| 0 | DRIVE | 100GB | 100 |
| 1 | DRIVE | 100GB | 100 |
| 2 | DRIVE | 100GB | NO |
| 3 | DRIVE | 100GB | NO |
| 4 | DRIVE | 100GB | NO |
| 5 | DRIVE | 100GB | 110 |
| 6 | DRIVE | 100GB | 110 |
| 7 | DRIVE | 100GB | 120 |
| 8 | DRIVE | 100GB | 120 |
| 9 | DRIVE | 100GB | 120 |
| ⋮ | ⋮ | ⋮ | ⋮ |

FIG.3

4 : CONFIGURATION TABLE

| PORT NUMBER ON THE DEVICE AREA NETWORK | DEVICE IDENTIFIER ON THE DEVICE AREA NETWORK | DEVICE TYPE |
|---|---|---|
| 0 | 0 | DRIVE |
| 1 | 1 | DRIVE |
| 2 | 2 | DRIVE |
| 3 | 3 | DRIVE |
| 4 | 4 | DRIVE |
| 5 | 5 | DRIVE |
| 6 | 6 | DRIVE |
| 7 | 7 | DRIVE |
| 8 | 8 | DRIVE |
| 9 | 9 | DRIVE |
| 100 | 100 | DKC |
| 101 | 100 | DKC |
| 102 | 100 | DKC |
| 103 | 100 | DKC |
| 104 | 100 | DKC |
| 115 | 110 | DKC |
| 116 | 110 | DKC |
| 120 | 120 | NAS |
| 121 | 120 | NAS |
| ⋮ | ⋮ | ⋮ |

FIG.4A

2 : ADDRESS TRANSLATION TABLE

| VOLUME IDENTIFIER | DEVICE IDENTIFIER | DEVICE ADDRESS | VOLUME CONFIGURATION INFORMATION |
|---|---|---|---|
| 0 | 0 | 0000-0FFF | RAID 1 |
| 0 | 1 | 0000-0FFF | RAID 1 |
| 1 | 0 | 1000-FFFF | RAID 0 |
| 1 | 1 | 1000-FFFF | RAID 0 |
| ⋮ | ⋮ | ⋮ | ⋮ |

FIG.4B

2 : ADDRESS TRANSLATION TABLE

| VOLUME IDENTIFIER | DEVICE IDENTIFIER | DEVICE ADDRESS | VOLUME CONFIGURATION INFORMATION |
|---|---|---|---|
| 0 | 0 | 0000-0FFF | RAID 1 |
| 0 | 1 | 0000-0FFF | RAID 1 |
| 1 | 0 | 1000-FFFF | RAID 0 |
| 1 | 1 | 1000-FFFF | RAID 0 |
| 4 | 2 | 0000-FFFF | RAID 5 |
| 4 | 3 | 0000-FFFF | RAID 5 |
| 4 | 4 | 0000-FFFF | RAID 5 |
| ⋮ | ⋮ | ⋮ | ⋮ |

1100 : DEVICE ASSIGNMENT REQUEST COMMAND

| HEADER PORTION | DESTINATION PORT NUMBER : #100 |
| | SOURCE PORT NUMBER : #115 |
| DATA PORTION | DESTINATION DEVICE IDENTIFIER : #100 |
| | SOURCE DEVICE IDENTIFIER : #110 |
| | COMMAND : DEVICE ASSIGNMENT REQUEST COMMAND |
| | DATA 1 : DEVICE TYPE=DRIVE |
| | DATA 2 : DEVICE CAPACITY=100GB |
| | DATA 3 : NUMBER OF DEVICES=3 |

AN EXAMPLE OF PRIOR ART

STORAGE SYSTEM AND MANAGEMENT METHOD OF THE STORAGE SYSTEM ENABLING ALLOCATION OF STORAGE DEVICES

BACKGROUND OF THE INVENTION

The present invention relates to information storage and, more particularly, to a storage system and a method for managing the storage system enabling external apparatuses to use data storage devices in the storage system.

In the recent computer environment, the amount of user data and information has rapidly increased, particularly with the Internet where it has come to be commonly used in an explosive fashion. Consequently, the amount of data to be stored is increasing. One of typical example of a data storage device is a magnetic disk storage (hereinafter referred to as a drive). At present, the growth of the amount of data to be stored is greater than the increase in the recording density of the drive.

Therefore, the number of drives used by users increases year by year and the number of drives mounted in a large-scale storage system is estimated to reach several thousands and more in the future. If, for example, we intend to realize a storage system with capacity of the order of petabytes using drives with capacity of several hundreds of gigabytes per drive, the required number of the drives will be on the order of several thousands. In this situation, the cost of managing data that increases day by day continues to rise and the reduction of such management cost is an important problem.

From the viewpoint of managing storage devices (drives), if a great number of devices are distributed and located, consolidated management thereof is impossible. If a small number of devices are collectively located, consolidated management thereof is simpler and management cost can be reduced.

As a conventional storage system, a disk subsystem is known. Lately, a storage area network (hereinafter abbreviated to SAN) and network attached storage (hereinafter abbreviated to NAS) have attracted attention.

An example of such conventional storage system is shown in FIG. 22. Disk subsystems 101, 111 and NAS 120 are roughly composed of a control section and a data storage section. For example, a disk subsystem includes a disk controller that is comprised of a channel control section for data input/output from/to a host, a cache, and a disk control section for controlling drives and a disk drive cluster consisting of a plurality of drives. Although the drives may be referred to hard disks or simply disks, the term drives is used hereinafter.

The NAS includes a local area network interface (hereinafter abbreviated to LANIF) for data input/output from/to a host, a cache, a disk control section for controlling drives and a plurality of drives. While the drives are exemplified as the units in the data storage section in the above drawing, disk arrays, each consisting of a plurality of drives, may be employed.

Meanwhile, the SAN is a network provided between hosts and the disk subsystem and is generally embodied with fiber channels. The SAN facilitates sharing the same disk subsystem across a plurality of hosts.

Consequently, the disk subsystems separately connected to each host are connected to the hosts via the SAN, thereby making it possible to integrate them into a storage system. In other words, a great number of small and medium scale disk subsystems that are distributed are organized into a small number of large scale consolidated disk arrays. Thus, consolidated data management can easily be carried out and the management cost can be reduced.

For such conventional storage system, however, the scalability in performance and capacity is not sufficient. This is because the control section and the data storage section of the conventional storage system are provided as fixed integral parts.

For the conventional storage system, for example, the number of drives that can be mounted per system is fixed and this number determines the capacity that can be provided by system. Therefore, if a client needs capacity more than the capacity that can be provided by a single disk subsystem, whereas requiring lower performance, a plurality of disk subsystems must be prepared. If a client needs performance higher than the performance that can be provided by a single disk subsystem, while requiring smaller capacity, a plurality of disk subsystems must be prepared. Consequently, a great number of storage systems are installed and this makes the management thereof complex.

In order to enhance the scalability while avoiding the rise of the cost of managing several thousands of drives and more, it is necessary to centralize the management of the drives. In attempting to simply enhance the scalability of a single disk subsystem, however, the control section is a bottleneck in performance.

To achieve enhanced scalability in performance and capacity, it is desirable to expand the disk controllers and the drives separately. To accomplish this, by connecting the disk controllers and drives via a network or switch, high scalability can be obtained. An example of such a known technique is disclosed in, for example, JP-A-11-296313 (hereinafter referred to as Reference 1).

One problem addressed by the present invention is to alleviate the burden of managing expanding user data and reducing the data management cost, which has not been solved by the above-mentioned technique.

In the conventional disk subsystem, the disk controller and the disk drive cluster that constitute the subsystem are fixed and there are limitations of scalability in performance and capacity. To achieve the scalability beyond the limit, a plurality of disk subsystems must be prepared which further increases management cost.

Reference 1 discloses connecting the disk controller and the disk drive cluster via a network or switch. However, centralized management of the drives is not described in Reference 1. Because disk controllers each separately manage drives, consolidated management of drives is impossible. When managing several thousands of drives and more, the management is complex. In addition, there is no description of drive reconfiguration management such as adding drives and copying data from drive to drive in Reference 1.

SUMMARY OF THE INVENTION

It is an object of the present invention is to enable a disk controller to make consolidated management of a great number of storage devices connected to a network provided within a disk subsystem. It is another object of the present invention is to make it possible to allocate storage devices to an external apparatus that needs to use some storage devices and connects to the network so that the external apparatus can use the storage devices allocated to it.

In one aspect, the present invention offers a storage system comprising a plurality of storage devices and a managing apparatus for managing the plurality of storage devices, wherein the plurality of storage devices and the managing apparatus are connected via a network or a switch. The managing apparatus is provided with a channel interface allowing an external apparatus that can use some of the storage devices to access a storage device via the managing apparatus. The network or switch is provided with an interface allowing an external apparatus that can use some of the storage devices to access a storage device via the network or switch.

The storage devices are drives or disk arrays, each consisting of a plurality of drives, and the storage system is a disk subsystem or network attached storage connected to a LAN.

In another aspect of the invention, the managing apparatus is provided with a LAN interface allowing an external apparatus that can use some of the storage devices to access a storage device via the managing apparatus and the network or switch is provided with a LAN interface allowing an external apparatus that can use some of the storage devices to access a storage device via the network or switch.

The managing apparatus is provided with a device allocation table containing information about the allocation of the storage devices to the managing apparatus or external apparatuses that can use the storage devices and a configuration table containing information about the connection of the storage devices and the managing apparatus or external apparatuses that can use the storage devices to the network or switch.

The storage devices include data management means for translating logical units to access into block units to access.

In a further aspect, the present invention offers a method for managing a storage system that comprises a plurality of storage devices and a managing apparatus for managing the plurality of storage devices, the plurality of storage devices and the managing apparatus being connected via a network or a switch, the method in which the managing apparatus is provided with a device allocation table containing information about the allocation of the storage devices to the managing apparatus or external apparatuses that can use the storage devices, receives a request to allocate one or more storage devices to an external apparatus that needs to use storage devices and connects to the network or switch, allocates the one or more storage devices to the external apparatus by referring to the device allocation table, and updates the device allocation table.

In the foregoing method for managing the storage system, the request to allocate one or more storage devices is issued from the administrative console of the storage system.

In yet another aspect, the present invention offers a method for managing a storage system comprising a plurality of storage devices and a managing apparatus for managing the plurality of storage devices, the plurality of storage devices and the managing apparatus being connected via a network or a switch, the method in which the managing apparatus is provided with a configuration table containing information about the connection of the storage devices and the managing apparatus or external apparatuses that can use the storage devices to the network or switch and manages the connection states of the storage devices and the managing apparatus or external apparatuses that can use the storage devices connected to the network or switch.

In a still further aspect, the present invention offers a method for managing a storage system comprising a plurality of storage devices provided with access control means and a managing apparatus for managing the plurality of storage devices, the plurality of storage devices and the managing apparatus being connected via a network or a switch, the method in which the managing apparatus is provided with a device allocation table containing information about the allocation of the storage devices to the managing apparatus or external apparatuses that can use the storage devices, allocates one or more storage devices in the storage system to an external apparatus that needs to use storage devices and connect to the network or switch, instructs the access control means of the storage device or devices to permit access from the external apparatus to which the storage device or devices have been allocated, and the storage device or devices will respond to access requests from only the external apparatus permitted for access thereto.

In yet another aspect, the present invention offers a method for managing a storage system comprising a plurality of storage devices and a managing apparatus for managing the plurality of storage devices, the plurality of storage devices and the managing apparatus being connected via a network or a switch, the storage devices including means for copying local data to another storage device connected to the network or switch and means for applying data updates made during copy operation to the copy-to-storage-device also, the method in which the managing apparatus instructs one of the storage devices to copy its local data to another storage device.

In a further aspect, the present invention offers a method for managing a storage system comprising a plurality of storage devices and a managing apparatus for managing the plurality of storage devices, the plurality of storage devices and the managing apparatus being connected via a network or a switch, the managing apparatus including means for copying data stored on one of the storage devices to another storage device connected to the network or switch and means for applying data updates made during copy operation to copy-from- and copy-to-storage-devices, the method in which the managing apparatus performs the following steps:

prior to the start of a copy, notifying an external apparatus that can use some of the storage devices and connects to the network or switch and that to which the copy-from-storage-device is allocated that the allocated storage device changes from the copy-from-storage-device to the managing apparatus;

copying the data from the copy-from-storage-device to the copy-to-storage-device;

applying updates made to the copy-from-data during the copy to the copy-from-storage-device and the copy-to-storage-device; and after the completion of the copy, notifying the external apparatus that can use some of the storage devices and that to which the copy-from-storage-device was allocated that the allocated storage device changes from the managing apparatus to the copy-from-storage-device.

In a still further aspect, the present invention offers a method for managing a storage system comprising a plurality of storage devices and a managing apparatus for managing the plurality of storage devices, the plurality of storage devices and the managing apparatus being connected via a network or a switch, the managing apparatus including means for remotely copying data stored on a storage device connected to the network or switch to a second remote storage system, the method in which the managing apparatus copies the data stored on a storage device connected to the network or switch, which has been allocated to an external apparatus that can use some of the storage devices and connects to the network or switch, to another storage device connected to the network or switch, and then remotely copies the copied data to the second remote storage system.

Other and further objects, features and advantages of the invention will appear more fully from the following description.

BRIEF DESCRIPTION OF THE DRAWINGS

In the attached drawings:

FIG. 2 illustrates exemplary contents of a device allocation table;

FIG. 3 illustrates exemplary contents of a configuration table;

FIGS. 4A and 4B illustrate exemplary contents of an address translation table;

DETAILED DESCRIPTION OF THE PREFERRED EMBODIMENTS

Preferred embodiments of the present invention will now be described, using FIGS. 1 to 21.

<Embodiment 1>

A preferred Embodiment 1 of the present invention will be described below, using FIGS. 1 to 14.

(I) Storage System Configuration

First, a storage system configuration in accordance with Embodiment 1 will be explained, using FIGS. 1 to 5.

Figure 1:
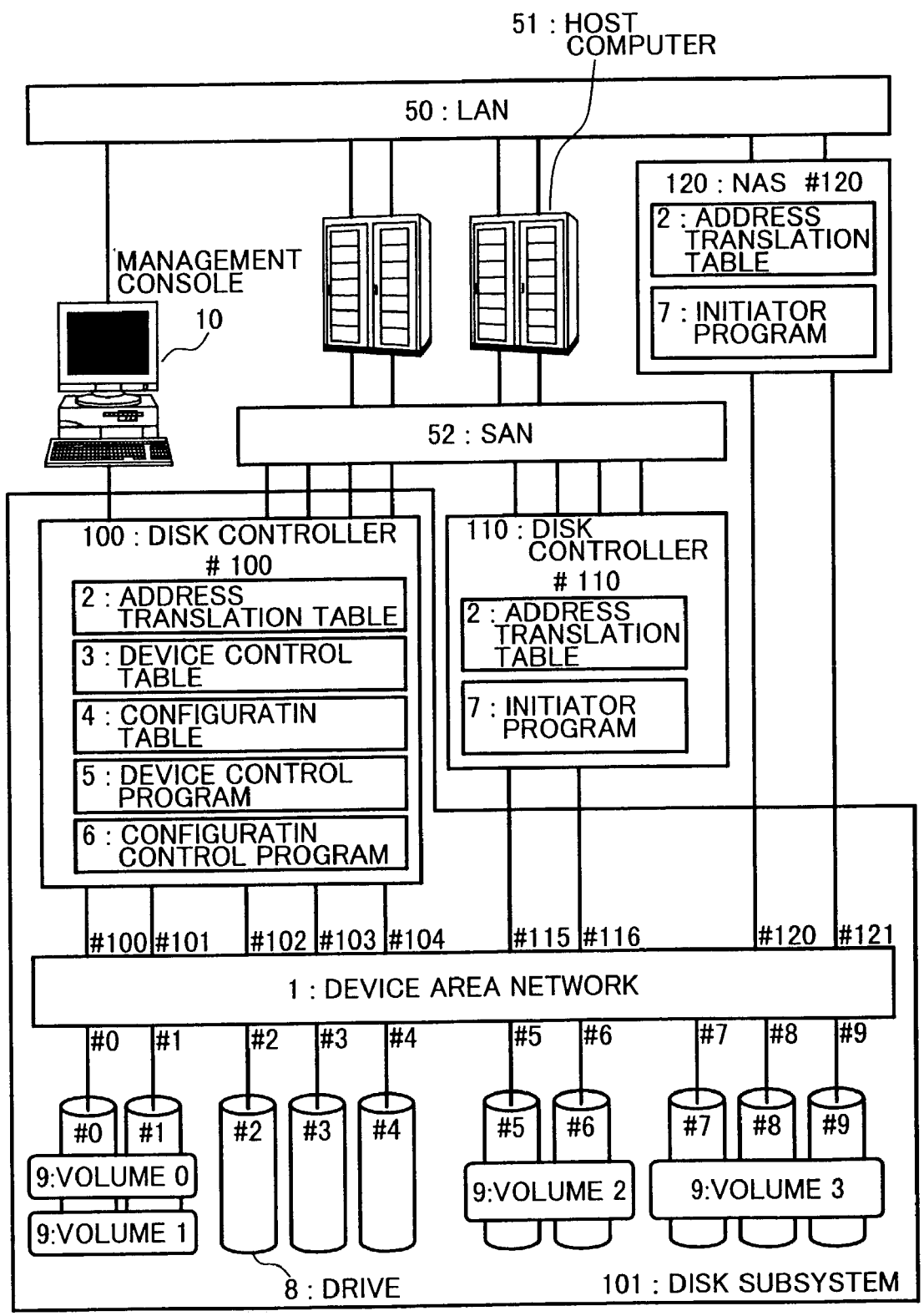
FIG. 1 is a block diagram showing the structure of a storage system configured, according to a preferred Embodiment 1 of the present invention.

FIG. 1 is a block diagram showing the structure of a storage system configured, according to Embodiment 1 of the present invention.

FIG. 2 illustrates exemplary contents of a device allocation table 3.

FIG. 3 illustrates exemplary contents of a configuration table 4.

FIGS. 4A and 4B illustrate exemplary contents of an address translation table 2.

Figure 5:
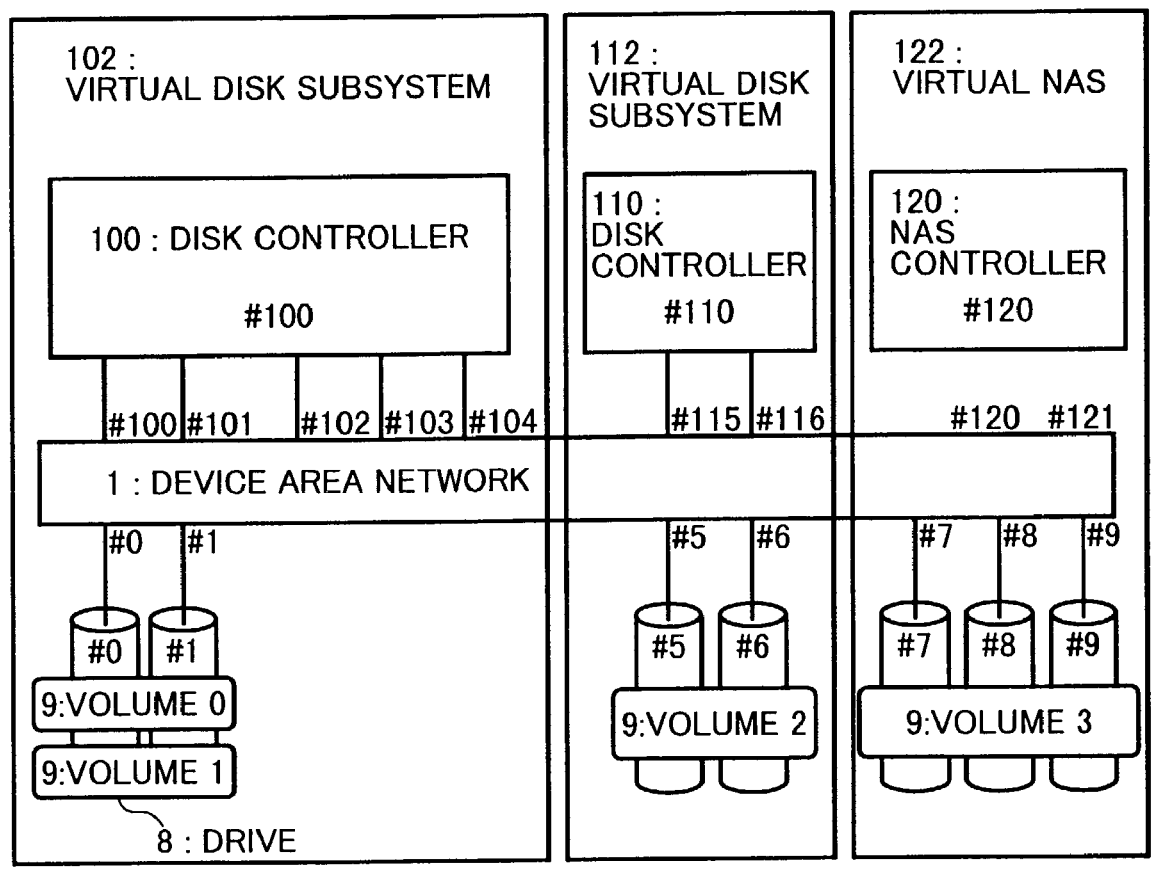
FIG. 5 is a conceptual diagram showing the structure of disk subsystems viewed from hosts in the storage system of the present invention.

FIG. 5 is a conceptual diagram showing the structure of disk subsystems viewed from hosts in the storage system of the present invention.

This section first gives an overview of the storage system and apparatuses using it and then explains the storage system in detail.

The storage system shown in FIG. 1 is embodied in a disk subsystem 101. The disk subsystem 101 connects to hosts 51 via SAN 52. The SAN 52 is a storage area network that is generally embodied in fiber channels. As examples of external apparatuses connecting to the disk subsystem 101, a disk controller 110, NAS 120, and an administrative console 10 are shown. The hosts 51 and NAS 120 connect to a LAN 50. The LAN 50 is a local area network that is generally embodied in Ethernet. A plurality of client computers and server computers are connected to the LAN 50, though they are not shown.

The management console 10 is an apparatus for performing various settings of the disk subsystem and managing or supervising the disk subsystem. The administrative console 10 also connects to the LAN 50 and its remote operation from another apparatus connected to the LAN 50 is possible. The disk subsystem 101 is roughly composed of a disk controller 100, a plurality of drives 8, and a device area network 1. The disk controller is also referred to as a DKC.

Generally, the disk controller includes a channel control section for performing communications with the hosts, a disk control section for performing communications with the drives, a cache memory where data is temporary stored, and a control memory in which control information within the controller is stored. The sections are equipped with a processor and a memory and perform control operations, according to diverse control programs stored in the memory. Details on the disk controller do not directly relate to the present invention and, therefore, the explanation thereof is not provided herein.

The device area network 1 may be embodied in fiber channels, Ethernet, and the like. The network may be formed to provide connections of a plurality of systems or using a switch in case failure occurs. A device that connects to the device area network 1 is assigned a device identifier by which the device is identified and a port number or port numbers through which the device connects to the device area network 1. For example, the drives shown are assigned device identifier #0 to #9 and port numbers #0 to #9, respectively. The device controller 100 is assigned device identifier #100 and port numbers #100 to #104 for each path. Fiber channels have their World Wide Names (WWNs) as their identifiers per port. If the device area network is embodied in fiber channels with a Small Computer System Interface (SCSI) as its upper layer protocol, WWNs should be used as port numbers and SCSI IDs as device identifiers.

As devices for storing data, the plurality of drives 8 is employed. Although the drives 8 are also referred to as magnetic disk storage devices or hard disks, the terms drives are used herein to clearly distinguish them from volumes that are management units in which the hosts view the storage, which will be described below.

The disk controller 100 is provided with an address translation table 2 for mapping addresses in volumes that are management units in which the hosts view the storage to actual drive addresses, a device allocation table 3 in which the drives (devices) are listed with their capacity and apparatus to which each drive (device) is allocated, a configuration table 4 in which devices and apparatuses connected to the device area network are set as a current system configuration, a device control program 5 to be executed for allocating a device to an apparatus, and a configuration control program 6 to be executed for registering an apparatus or device to connect it to the device area network or removing an apparatus or device to disconnect it from the network. On the disk controller 110 and NAS 120 that may use the drives 8 in the disk subsystem 101, a device request program 7 is installed that is executed to request the disk subsystem 101 to allocate a device and An address translation table 2 is stored also. The NAS 120 is equipped with a processor and a memory for diverse kinds of processing, though they are not shown. Moreover, the NAS is often provided with a cache memory that is temporary high-speed storage of data and its control memory.

In the geographical aspect, the hosts 51, NAS 129, disk controller 110, and disk subsystem 101 can be remotely located from each other. This is because Ethernet and fiber channels are able to interconnect the apparatuses, systems, and devices that are installed in geographically remote locations via a router and a switch.

The disk subsystem 101 manages and knows what apparatuses and devices are connecting to the device area network 1, using the configuration table 4. Accordingly, after an apparatus or a storage device connects to the device area network 1, it must be registered into the configuration table 4 to enable data transfer from/to it over the network.

The disk subsystem 101 also manages allocating a device connected to the device area network to what apparatus. Thus, an apparatus that connects to the device area network 1 to use a storage device must have the storage device allocated by the disk subsystem to it beforehand.

In the following, the device allocation table 3 that is used for allocation and the configuration table 4 that is used for registration will be explained. Details on the device allocation table 3 will be explained below, using FIG. 2.

In Embodiment 1, the disk controller 100 manages the devices connected to the device area network 1. The table for this management is the device allocation table 3. The table has the following entry headers: device identifier, device type, capacity of device, and device identifier to which storage device is allocated, which are shown in the order from the left. The device identifier is the identifier assigned to each storage device connecting to the device area network 1 and this is a unique number within the device are network 1. The device type indicates the type of the storage device such as drive, RAID, NAS, function-added disk, and tape; any type is set in this column. The capacity of disk indicates the maximum capacity of the storage device.

The device identifier to which the storage device is allocated is the device identifier of the apparatus to which the storage device was allocated for use. When this table is searched by the key of a device identifier, the device's information and what apparatus to which the device is allocated can be known. In the case of the table containing the settings illustrated in FIG. 2, for a storage device with identifier #0, it is seen that the device is a drive with capacity of 100 GB and the disk controller with device identifier #100 uses this drive. For a storage device with identifier #5, it is seen that the device is a drive with capacity of 100 GB and the disk controller with device identifier #110 uses this drive. When this table is searched for "NO" in the column of device identifier to which storage device is allocated, idle devices that are not allocated can be known. In the illustrative table, it is seen that drives with device identifiers #2, #3, and #4 are idle and newly allocable to apparatus.

Details on the configuration table 4 will now be explained, using FIG. 3. In Embodiment 1, the disk controller 100 manages configuring the storage devices or apparatuses connected to the device area network 1. The table for this management is the configuration table 4. The table has the following entry headers: port number connected to device area network, device identifier connected to device area network, and device type, which are shown in the order from the left. The port number is the number designator of a port connected to the device area network and this is a unique number within the device area network. The device area network carries data to the port identified by the destination port number and the data is transferred through the port to the destination device. The device identifier is the same as described for FIG. 2.

The device type indicates the type of storage device such as drive or the type of the apparatus such as DKC and NAS. When the configuration table 4 is searched by the key of a port number, the identifier and the type of the device or apparatus connected through the port can be seen. For example, it is seen that the one connected to port number #0 is the drive with device identifier #0. Some device or apparatus may have a plurality of connection ports. Thus, there is not always one-to-one correspondence between a port number and-a device identifier. For example, it is seen that port numbers #100 to #104 are the connections of the same device identifier #100 that is a DKC. When the table is searched by the key of a device identifier, the port(s) of the device can be seen.

The address translation table 2 will now be explained, using FIG. 4. The hosts 51 view the drives in logical drive units generated from one drive or a plurality of drives 8. These logical units are called volumes. In FIG. 1, for example, volumes #0 and #1 are generated from drives #0 and #1. The disk controller manages generating a volume from what drive or drives. The disk controller generates one volume from a plurality of drives and makes the volume identifiable to the hosts. In this case, the hosts identify the volume instead of identifying the drives constituting the volume. The hosts perform data input/output to/from a volume address.

The disk controller translates the specified volume address into an actual drive address and performs input/output to/from the drive. In this case, the disk controller need to have mapping between the volumes that the hosts view and the drives addresses, and the address translation table 2 is used for this purpose. Those exemplified in FIG. 4 are illustrative examples of the address translation table retained on the disk controller 100 shown in FIG. 1.

FIG. 4A represents the address translation table having the settings for the volumes and drives shown in FIG. 1 and FIG. 4B represents the address translation table having the settings for the volumes and drives shown in FIG. 1 plus volume 4 consisting of drives #2, #3, and #4. A plurality of volumes may be allocated to the same drive. Thus, the address translation table includes an entry header of address of device space that indicates what extent of space of a device is allocated for a volume. For example, in FIG. 4A, both space 000-0FFF of device identifier 0 and space 000-0FFF of device identifier 1 make volume 0.

If a plurality of drives forms into a disk array, RAID configuration information such as RAID0, 1, and 5 is required. When translating a volume address into a drive address and vice versa, this configuration information is also referred to. Striping size or the like in addition to the information that simply indicates RAID configuration is also required as configuration information, but this does not directly relate to the present invention and therefore its explanation is not made herein.

When the volumes and drives shown in FIG. 1 are set in the address translation table as in FIG. 4A, how the disk subsystem and the drives are viewed from the hosts will now be explained, using FIG. 5. The hosts 51 view the disk controller 100 as having volumes 0 and 1. In this case, it appears to the hosts that the disk controller 100 and drives #0 and #1 form a virtual disk subsystem 102. Similarly, it appears to the hosts that the disk controller and drives #5 and #6 form a virtual disk subsystem 112. Furthermore, it appears to the hosts that the NAS controller 120 and drives #7, #8, and #9 form a NAS 122.

(II) Storage System Management Method

A storage system management method according to Embodiment 1 will now be described, using FIGS. 6 to 14.

Figure 6:
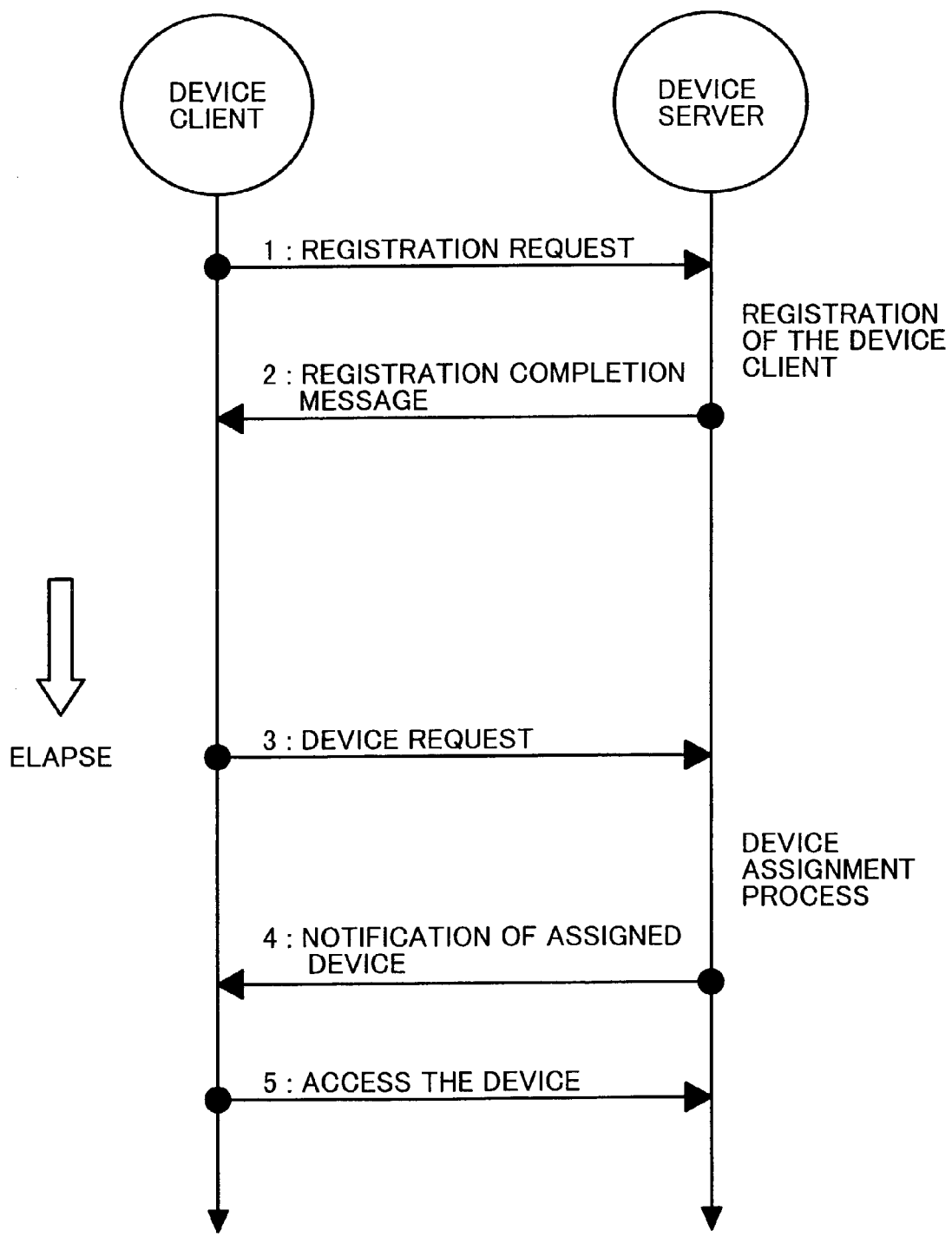
FIG. 6 is a sequence diagram illustrating a communication procedure between a device requester apparatus and a device managing apparatus in time sequence, according to the present invention.

FIG. 6 is a sequence diagram illustrating a communication procedure between a device requester apparatus and a device managing apparatus in time sequence, according to the present invention.

Figure 7:
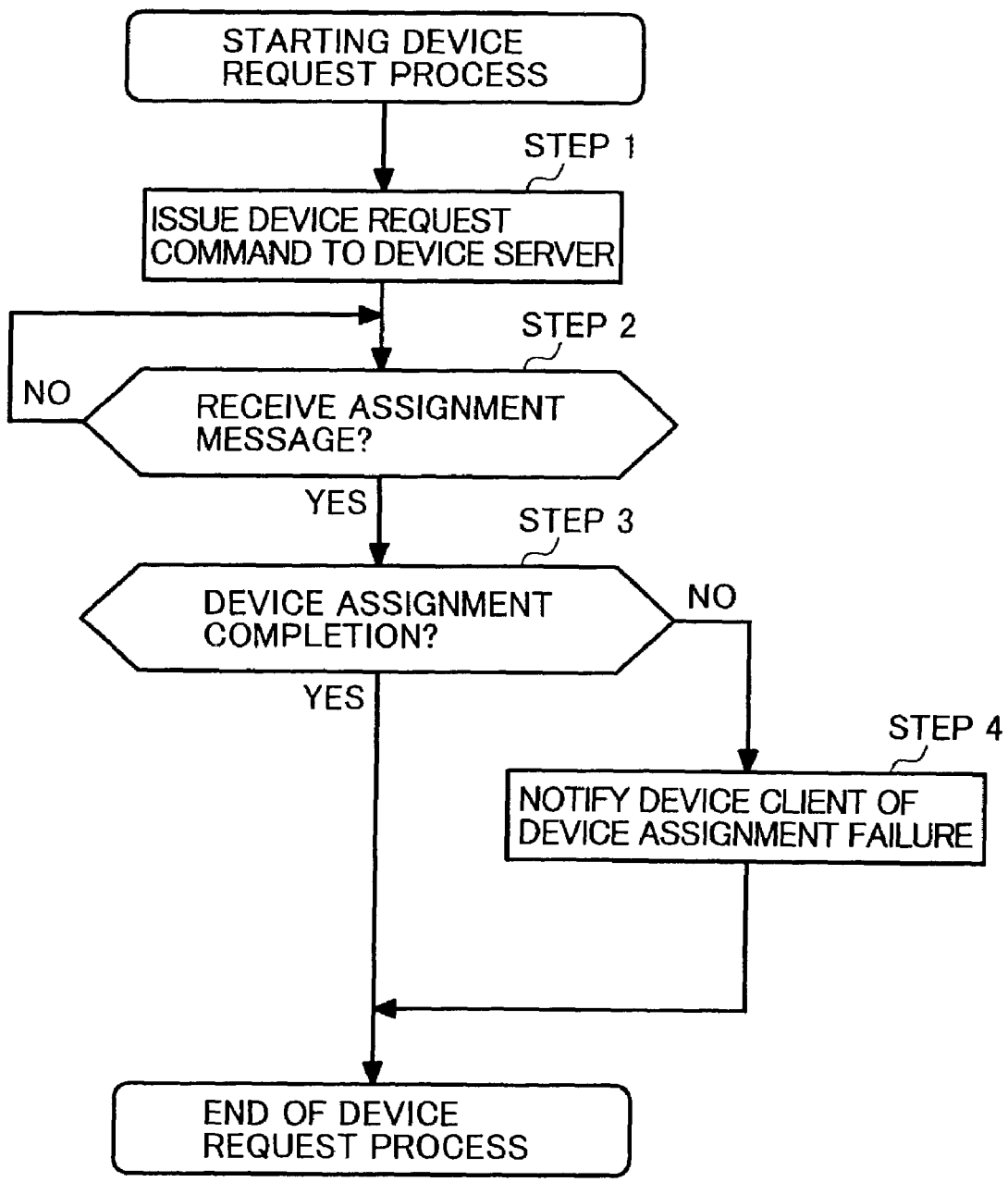
FIG. 7 is a flowchart illustrating a device request process.

FIG. 7 is a flowchart illustrating a device request process.

Figure 8:
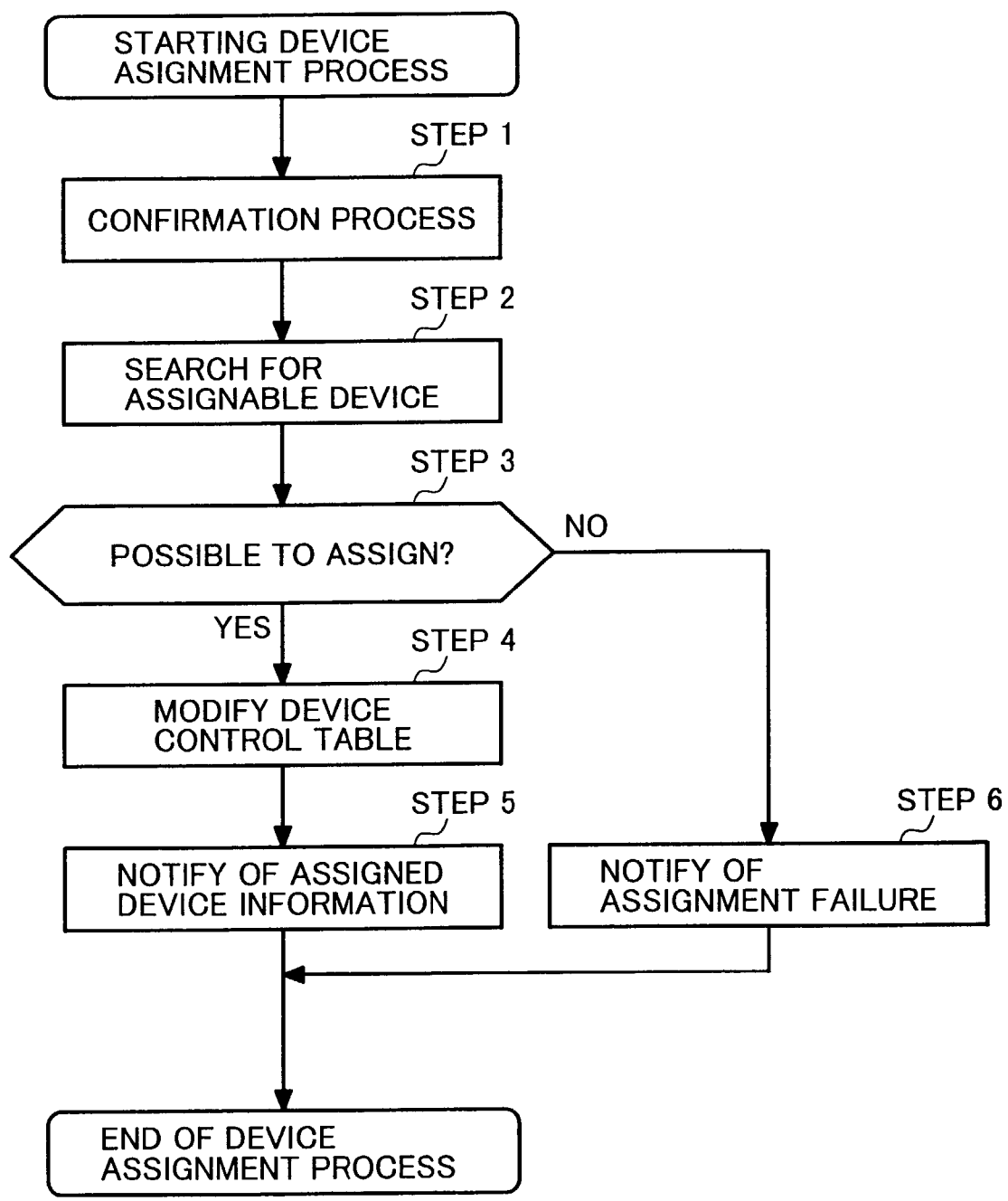
FIG. 8 is a flowchart illustrating a device allocation process.

FIG. 8 is a flowchart illustrating a device allocation process.

Figure 9:
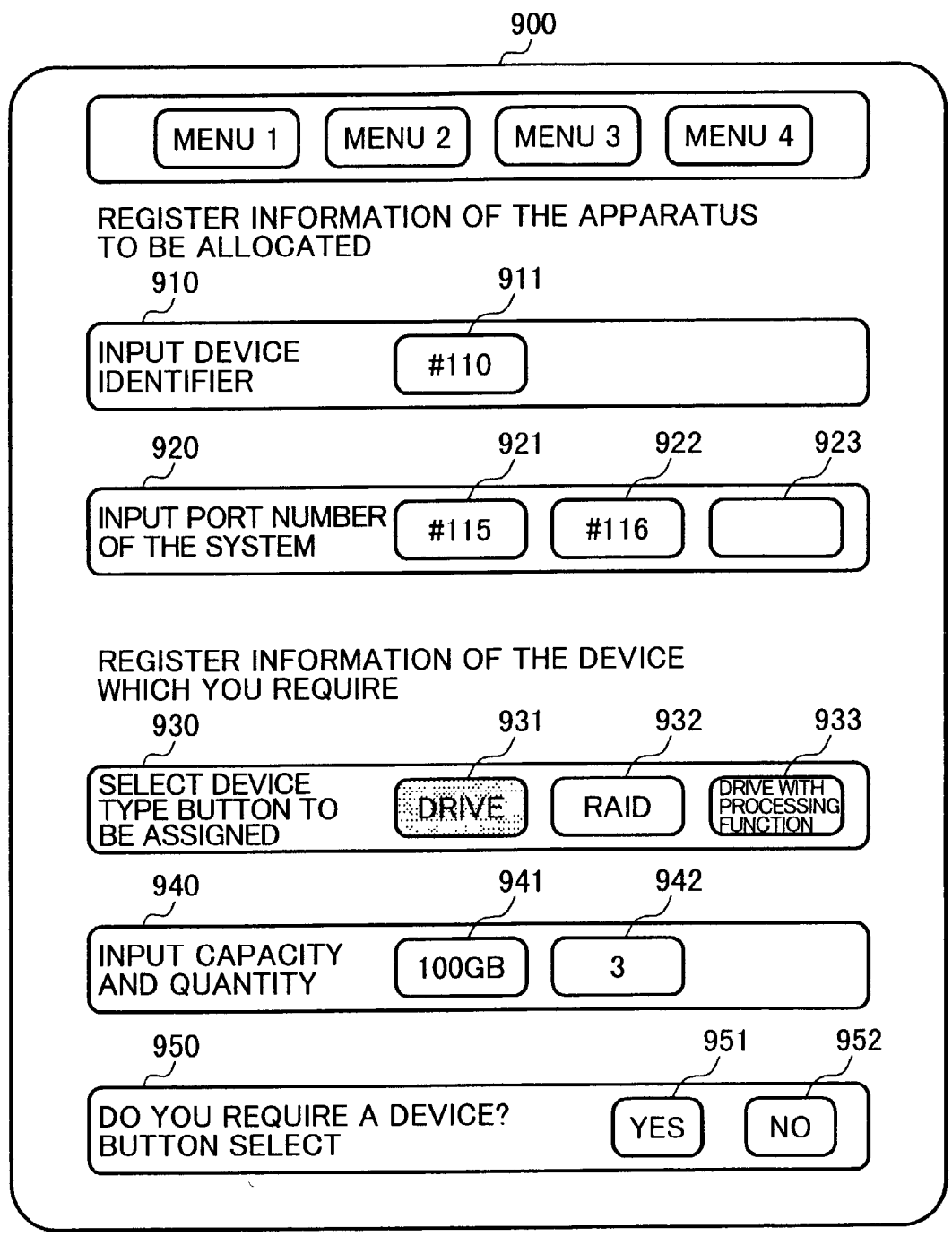
FIG. 9 illustrates a device allocation request form presented on a screen.

FIG. 9 illustrates a device allocation request form presented on a screen.

Figure 10:
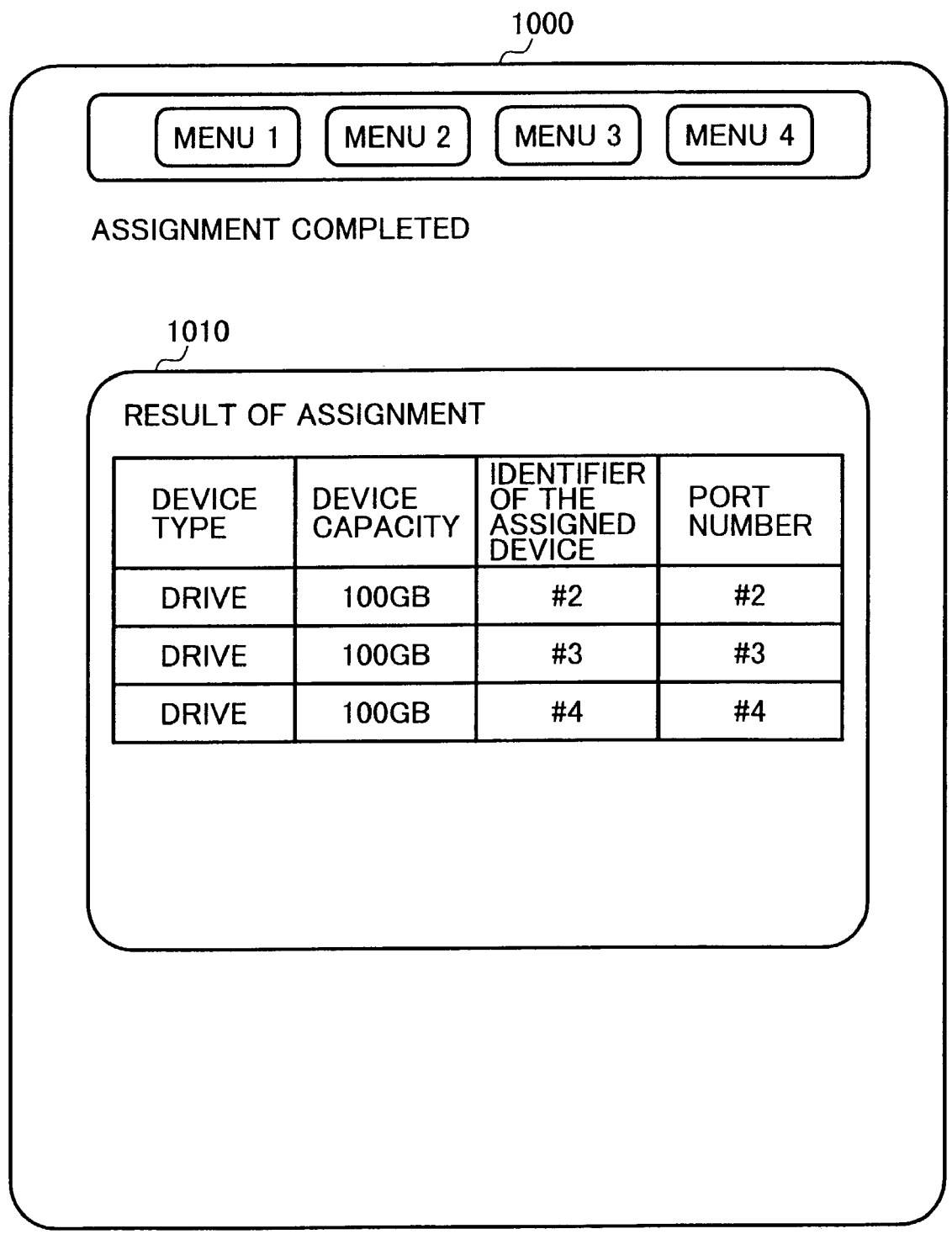
FIG. 10 illustrates device allocation results returned on a screen.

FIG. 10 illustrates device allocation results returned on a screen.

Figure 11:
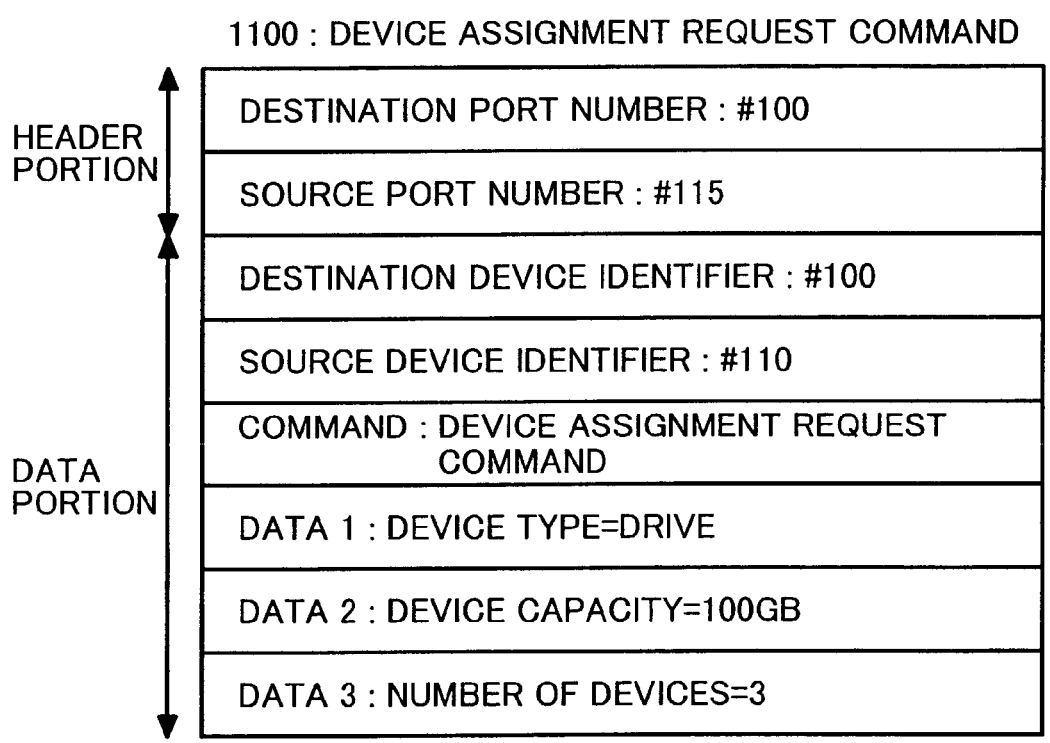
FIG. 11 illustrates an exemplary device request command.

FIG. 11 illustrates an exemplary device request command.

Figure 12:
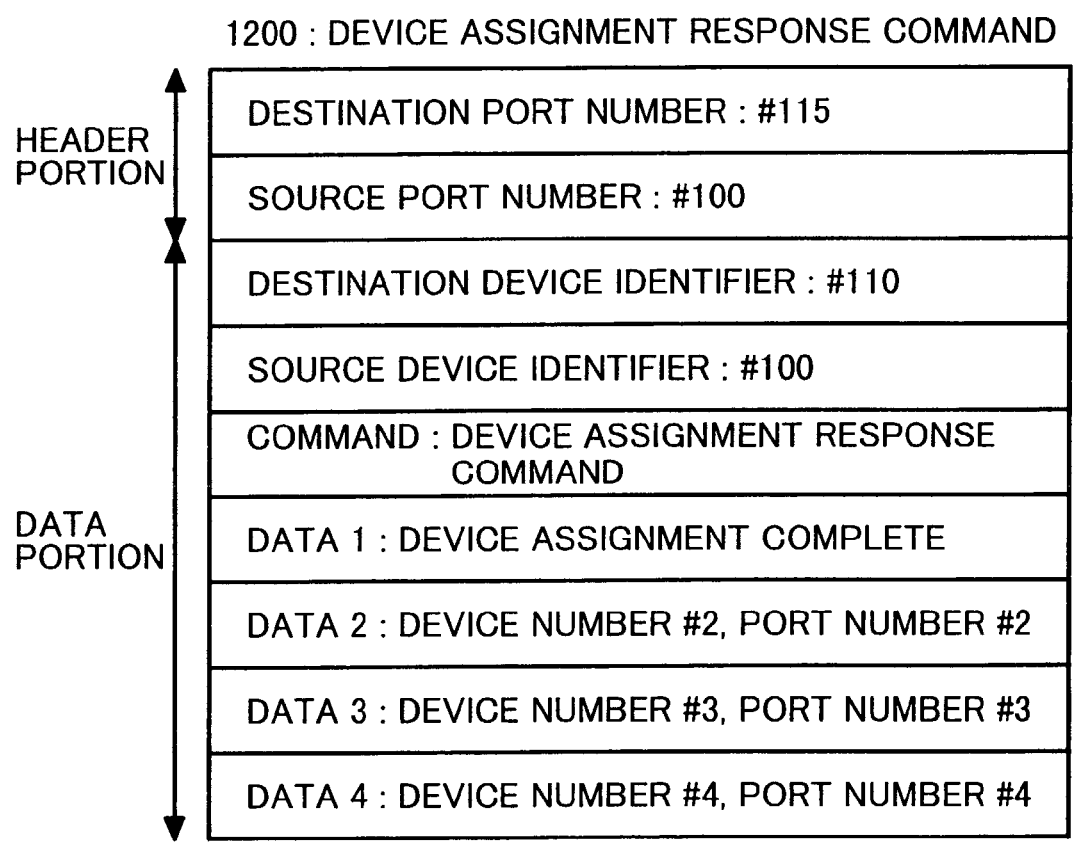
FIG. 12 illustrates an exemplary response command to a device request.

FIG. 12 illustrates an exemplary response command to a device request.

Figure 13:
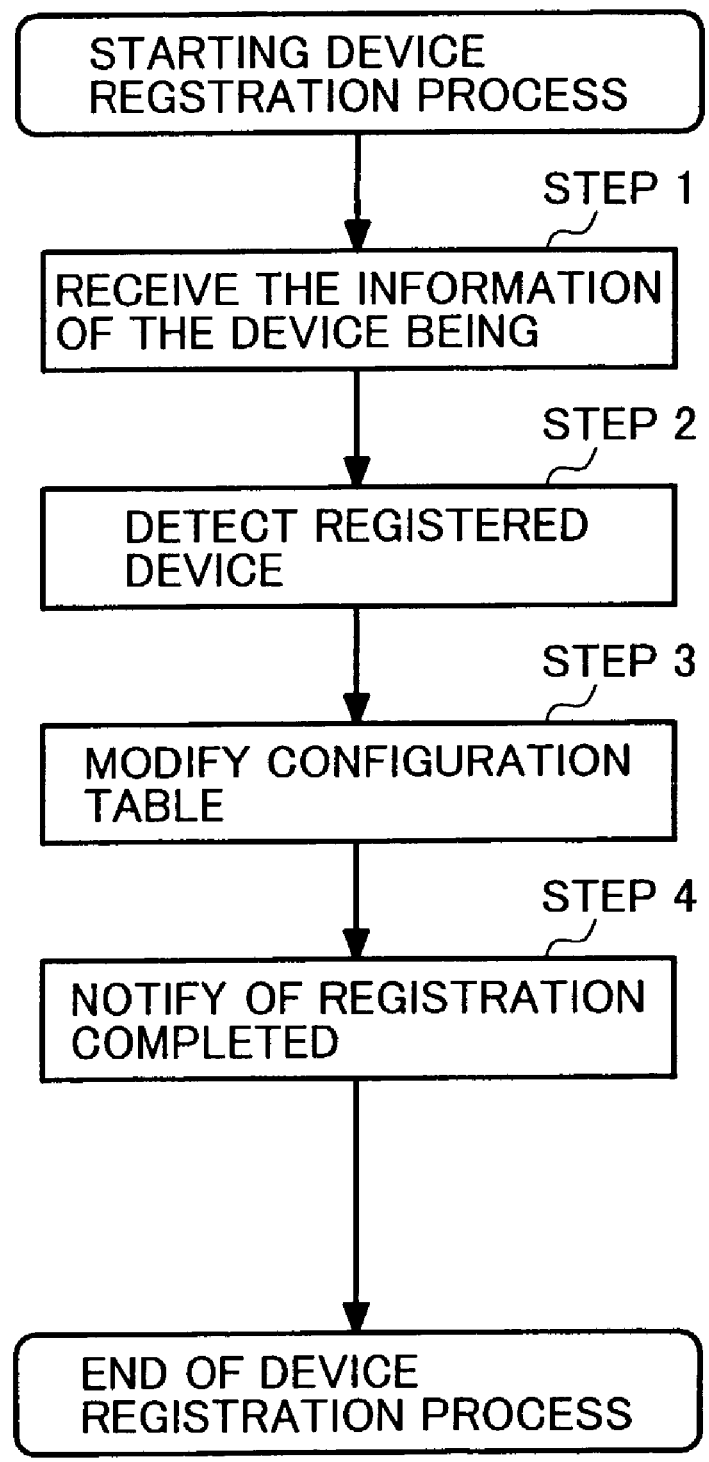
FIG. 13 is a flowchart illustrating a device registration process.

FIG. 13 is a flowchart illustrating a device registration process.

Figure 14:
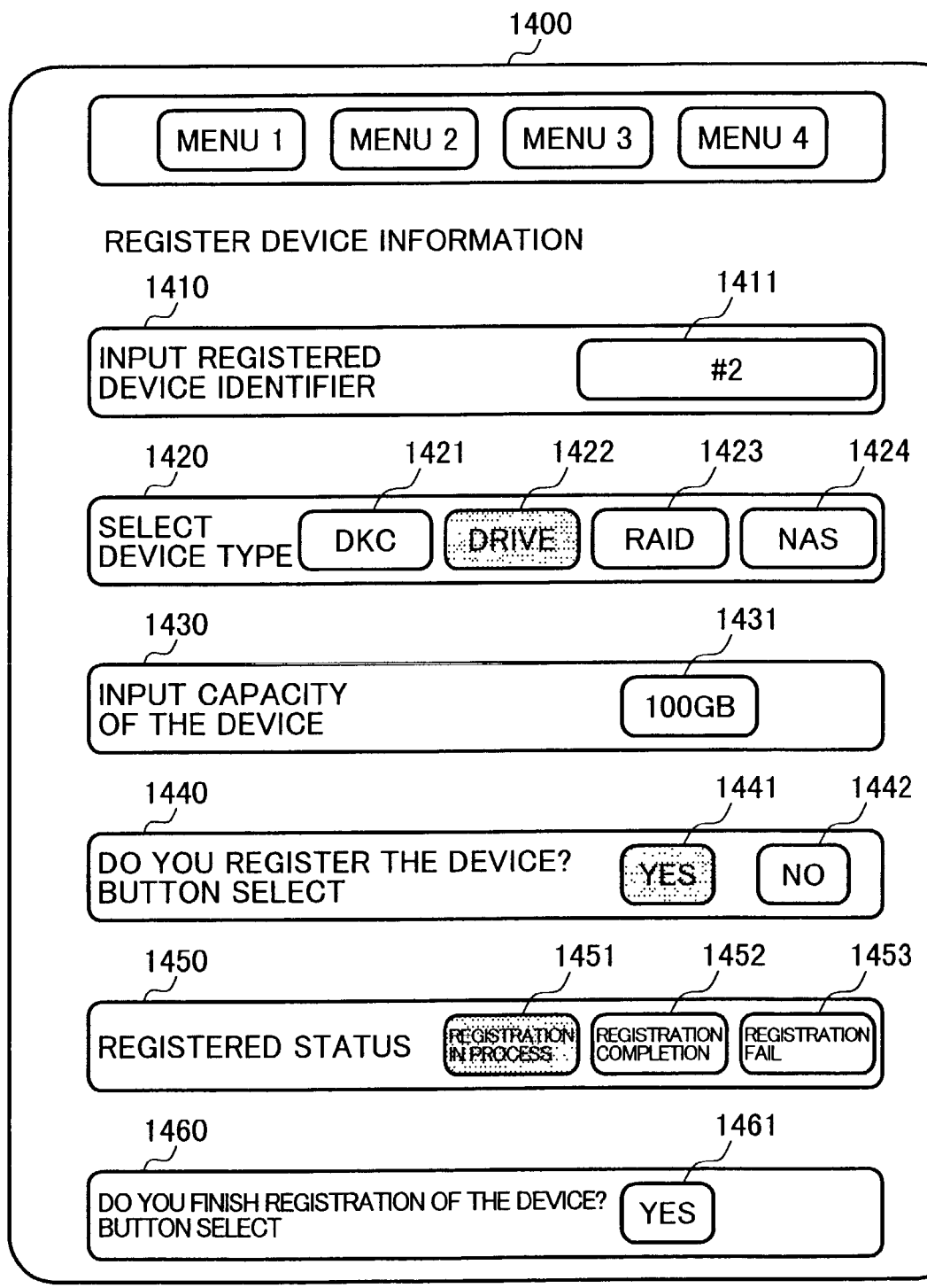
FIG. 14 illustrates a device registration form presented on a screen.

FIG. 14 illustrates a device registration form presented on a screen.

A communication procedure between a device managing apparatus that accommodates and manages the devices and a device requester apparatus that issues a request to allocate a device to be used will now be explained, using FIG. 6.

In the case of the configuration shown in FIG. 1, the device managing apparatus is the disk subsystem 101 and the device requester apparatus is the disk controller 110 or NAS 120.

The illustrative procedure shown in FIG. 6 assumes time to be elapsing from top to bottom. First, the device requester apparatus must register with the disk subsystem. To explain with reference to FIG. 1, the disk controller 110 must register with the disk subsystem after connecting to the device area network 1. The device requester apparatus sends a request for registration together with the port number that it uses and its device identifier and device type to the device managing apparatus (step 1). Upon receiving the request, the device managing apparatus registers the received information into the configuration table 4. At this time, it is preferable to make sure that the device requester apparatus is connected to the device area network 1 and communicable with the disk subsystem. Upon the completion of the registration, the device managing apparatus sends a registration complete message to the device requester apparatus (step 2).

If the device area network 1 is embodied in fiber channels or the like, the protocol does not require that an apparatus must register with the device managing apparatus whenever it connects to the network. However, registering the device requester apparatus with the device managing apparatus as described above enables the managing apparatus to make consolidated management of all apparatuses and devices connected to the device area network 1. Then, the device requester apparatus whose registration has been completed requests the device managing apparatus to allocate a storage device such as a drive connected to the device area network 1 (step 3). This request message includes information such as the capacity and type of the device of request.

In response to the request, the device managing apparatus searches the device allocation table 3 for an idle device and allocates it to the requester apparatus. When an idle device is allocated, the "device identifier to which storage device is allocated" column field for the device in the device allocation table 3 changes from "NO" to the device identifier of the requester apparatus. The device managing apparatus then notifies the requester apparatus of allocation results including the device identifier and port number (step 4). The apparatus to which the device was allocated generates a volume identifiable to the hosts, using the allocated device, and then accesses the data stored on the device (step 5).

The above-described device request process will now be explained in detail. When the device requester apparatus is requested to generate a volume from a host or a device request event occurs in it, it activates the device request program 7. The program may be activated through the administrative console 10 or remotely activated by communication means.

As is illustrated in FIG. 7, the operation of the device request program 7 is as follows. First, issue a device request to the managing apparatus (step 1). Then, wait for receiving notification of allocation (step 2). Upon receiving the notification of allocation, judge whether device allocation is successful (step 3). If the device allocation is successful, terminate the request process. If it ends in failure, notify the device requester of allocation failure (step 4) and terminate the request process.

In the case of allocation failure, it is necessary to request the device managing apparatus to increase devices. For this purpose, separate means may be used to make the administrator directly request the device managing apparatus to increase devices. The above-described device allocation process will be explained in detail. To make the device managing device initiate the device allocation process, the device control program 5 should be activated by request from the device requester apparatus. The device requester apparatus may be an external part of the managing apparatus such as the administrative console of the managing apparatus.

As is illustrated in FIG. 8, the operation of the device control program 5 is as follows. First, it is preferable to confirm that the requester apparatus actually connects to the device area network (step 1). Device request may be issued from the administrative console of the managing apparatus without the intervention of the device area network. In this case, the above confirmation is effective. Then, the device allocation table 3 is searched for an allocable device or devices (step 2). Then, it is determined whether the allocable device or devices meet the requested allocation conditions such as the capacity and quantity of the devices (step 3).

If allocation meeting the requested conditions is possible, for a newly allocated device in the device allocation table 3, the setting in the "device identifier to which storage device is allocated" column field is updated to the identifier of the requester apparatus (step 4). For example, if the disk controller 110 in FIG. 1 issued a request to newly allocate three drives of 100 GB, currently idle drives #2, #3, and #4, searched out from the device allocation table 3 in FIG. 2, should be allocated. Accordingly, their "device identifier to which storage device is allocated" column fields in the above table are updated to #110.

Then, the requester of the allocated devices is notified (step 5). This notification includes the identifiers of the allocated devices and the port numbers assigned to the devices. If, for example, the above drives #2, #3, and #4 are allocated, the notification includes their port numbers #2, #3, and #4. The port numbers can be known by accessing the configuration table 4. If no idle devices are found in the step 3 or if the requester apparatus cannot be identified in the step 1, on the other hand, the requester of allocation failure is notified (step 6). In this notification, a reason for the notification failure may be specified.

For an illustrative case that a device allocation request is issued from the administrative console 10, its request form and results presented on the console's display screen will now be explained, using FIGS. 9 and 10. The same request form and results may be presented on the display screen of an external apparatus from which an allocation request is issued. FIG. 9 illustrates the request form presented on the display screen 900, wherein a request to newly allocate three drives of 100 GB to the disk controller 110 is issued, using this form. Menus at the top are provided for different kinds of operation. The operator is prompted enter a requester apparatus and its port(s) in areas 910 and 920. In the area 910, a device identifier is input in its input field 911.

Input operation should be performed, using the keyboard or the like of the administrative console 10; the same applies to all the input operations that will be described hereinafter. When selection is required, the operator should use a mouse or the like. By way of example, the identifier #100 of the disk controller 110 is input as shown and it is seen that the disk controller 110 is the device requester apparatus. In the area 920, the port numbers assigned to the apparatus are input, using input fields 921 to 923. By way of example, the port numbers #115 and #116 for the disk controller 100 are input as shown. Three input fields are provided in this example, but this is not requirement and the input fields may increase if necessary. In the illustrative case as shown, two input fields are filled with the port numbers and the third input field 923 is blank.

The operator is also prompted to set device attributes you need in areas 930 and 940. In the area 930, a device type to be allocated is set. One of the select buttons, drive 931, RAID 932, function-added drive 933 is clicked. Once any button has been clicked, its display color changes so that its selected state is recognizable. By way of example, the drive 931 is selected as shown.

In the area 940, the capacity and quantity of the devices of request are input. The capacity in its field 941 and quantity in its field 942 are input. By way of example, three drives of 100 GB are requested as shown. A prompt message in the area 950 asks if you submit the device request. After completing the settings in the above areas, if you click the "Yes" button 951, then the request is issued. If you click the "No" button 952, the request process is aborted.

FIG. 10 illustrates a response to the device request illustrated in FIG. 9, which is returned on the display screen. Returned allocation results 1010 tell the requester three drives of 100 GB have been allocated as requested. The results also inform the requester of the device identifiers of the drives and the port numbers for accessing the drives. Then, a device allocation procedure through communication over a network, using commands for this purpose, will be explained, using FIGS. 11 and 12.

FIG. 11 illustrates an exemplary allocate device request command that is used when issuing a request to allocate devices over the network corresponding to the request illustrated in FIG. 9. The command 1100 is roughly composed of a header and a payload. In the header, the destination and source port numbers are specified for transmitting the command on the network. By reading the header, the network device can determine what port to which the command is to be sent over the network. The payload contains the data by which the receiving apparatus connected to the destination port parses and interprets the command. The destination device identifier enables the apparatus that received the command to verify that the command was sent to it. The source device identifier enables the above apparatus to identify the apparatus that issued the command. In the illustrative command example, the disk controller 110 issues a request to newly allocate drives to the disk controller 100 that manages drive allocation. By the command name, the receiving apparatus can know the command to allocate devices. By the command data 1, 2, and 3, the receiving apparatus can understand that it is requested to allocate three drives of 100 GB.

FIG. 12 illustrates an exemplary response command to the device request command exemplified in FIG. 11. The command 1200 is roughly composed of a header and a payload. The port numbers in the header and the device identifiers in the payload are the same as exemplified in FIG. 11. However, this command is a response to the request and therefore its destination and source are reverse to those of the request command. By the command name, the requester apparatus can know a response command to the request to allocate devices. By the command data 1, 2, 3, and 4, the requester apparatus can understand that device allocation is successful and devices with identifiers #2, #3, and #4 respectively using ports #2, #3, and #4 have been allocated to it.

The device registration process will now be explained, using FIG. 13. Registering a device or apparatus should be performed after the device or apparatus physically connects to the device area network 1. A registration request may be issued by the administrative console 10 or by communication from an apparatus to be registered that is provided with a device registration request program. If, for example, a storage device such as a drive is registered, the registration request should be issued from the administrative console. If the disk controller 110 or NAS 120 is registered, the registration request should be issued from the device registration request program installed on the apparatus to be registered.

FIG. 13 illustrates the registration process to be carried out by the configuration control program 6 installed on the disk controller 100 shown in FIG. 1. The process is as follows: First, information for the device or apparatus to be registered is received (step 1). If, for example, drive #2 is registered, this information comprises drive as device type, its capacity of 100 GB, device identifier of #2, and port number of #2.

When the configuration control program 6 receives a registration request, it confirms that the device or apparatus to be registered connects to the device area network 1 (step 2). Although the step 2 is not mandatory, it is desirable to execute this step because confirming whether the device to be registered is identifiable is, in effect, checking for a connection error. Then, the configuration table 3 to register the device is updated (step 3). Finally, a registration complete message is returned (step 4).

While device identifiers are assumed to be assigned in advance by the administrator in Embodiment 1, it is also possible that the disk controller 100 that is the managing apparatus automatically assigns an identifier to a device or external apparatus. In the later case, the device identifier is not specified when a registration request is issued and an identifier assigned to the device should be returned in the registration complete message. To remove a registered device, the device data is deleted from the configuration table 3.

For an illustrative case that a request to register a device is issued from the administrative console 10, its request form presented on the console's display screen will now be explained, using FIG. 14. The same request form may be presented on the display screen of an external apparatus from which an allocation request is issued. FIG. 14 illustrates the request form for registering a new drive #2 of 100 GB connected to port #2 with the disk controller 110, which is presented on the display screen 1400. Menus at the top are provided for different kinds of operation. The operator is prompted to enter the ID and attributes of the device to be registered in areas 1410, 1420, and 1430. In the area 1410, the device identifier is input in its input field 1411. By way of example, drive identifier #2 is input as shown. In the area 1420, the type of the device is selected. One of the select buttons DKC 1421, drive 1422, RAID 1423, and NAS 1424 is clicked. By way of example, the drive is selected as shown. In the area 1430, the capacity of the device is input in its field 1431. By way of example, "100 GB" is input as shown.

A prompt message shown in area 1440 asks if you want the device registered. The "Yes" button 1441 is clicked to issue a request to register the device or the "No" button 1442 is clicked to abort the registration. By way of example, the "Yes" button 1441 is clicked. In area 1450, a registering process state is shown. When the "Yes" button 1411 is clicked and the registering process starts, the display color of the "In Process" button 1451 changes. When the registering process normally terminates, the display color of the "Complete" button 1452 changes. In case of registration failure, the display color of the "Failure" button 1453 changes. In the illustrative case as shown, it is seen that registering is in process. A prompt message shown in area 1460 asks if you quit registration. When you click the "Yes" button 1461, the registration process terminates.

<Embodiment 2>

A preferred Embodiment 2 of the present invention will be described below, using FIG. 15. This section describes only alterations or additions to Embodiment 1.

Figure 15:
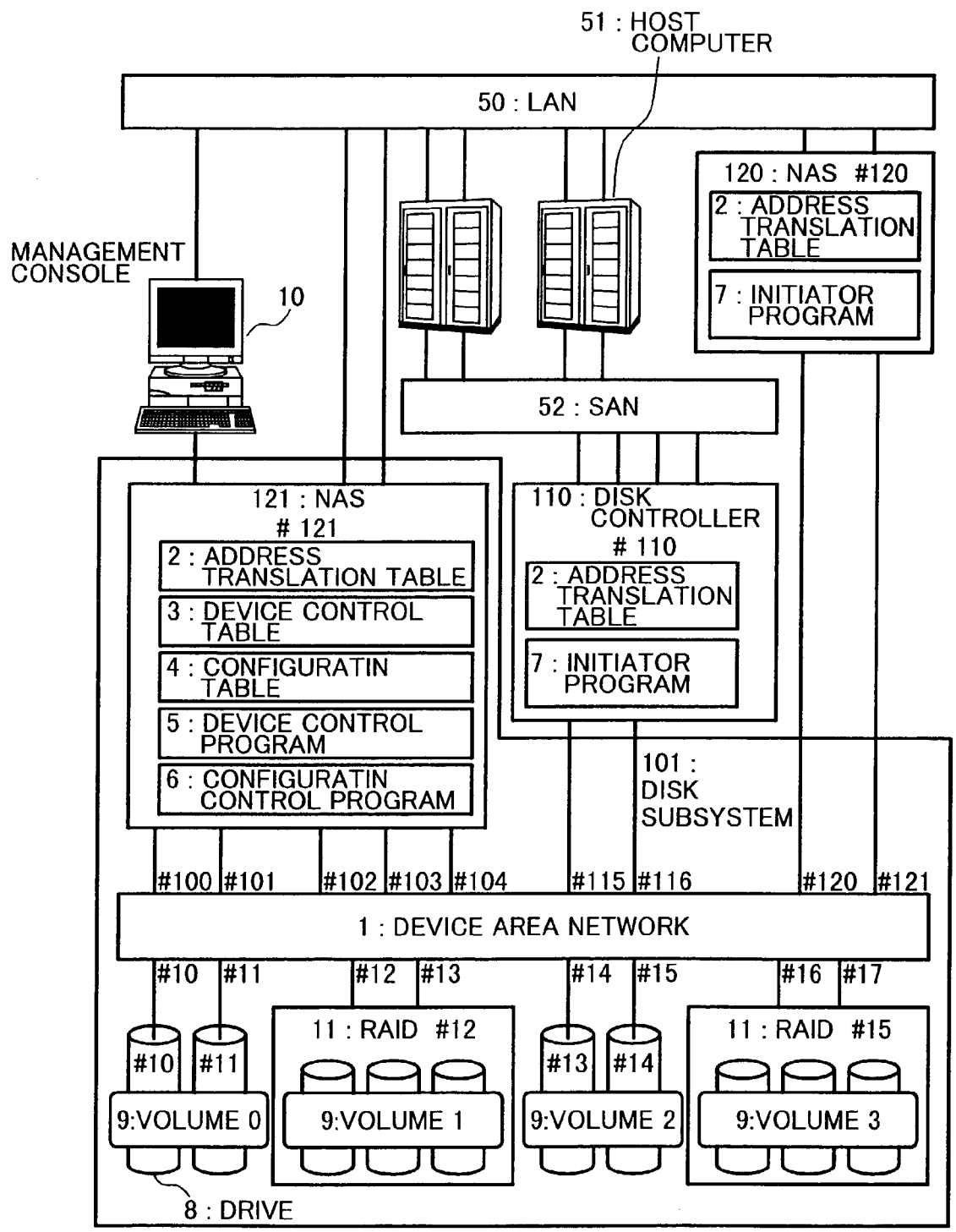
FIG. 15 is a block diagram showing the structure of a storage system configured, according to a preferred Embodiment 2 of the present invention.

FIG. 15 is a block diagram showing the structure of a storage system configured, according to Embodiment 2 of the present invention.

The storage system of Embodiment 2 includes RAIDs 11 as part of the storage devices connected to the device area network 1. The RAIDs, each consisting of a plurality of drives, have high performance and high reliability features. Data transfer performance of each individual drive is lower than that of the network. Even if the performance of the network is enhanced, the low data transfer performance of each individual drive is a bottleneck. By using the RAIDS, each consisting of a plurality of drives, in place of individual drives, high data transfer performance can be achieved. Another feature of Embodiment 2 is using a NAS 121 as the device managing apparatus.

<Embodiment 3>

Figure 16:
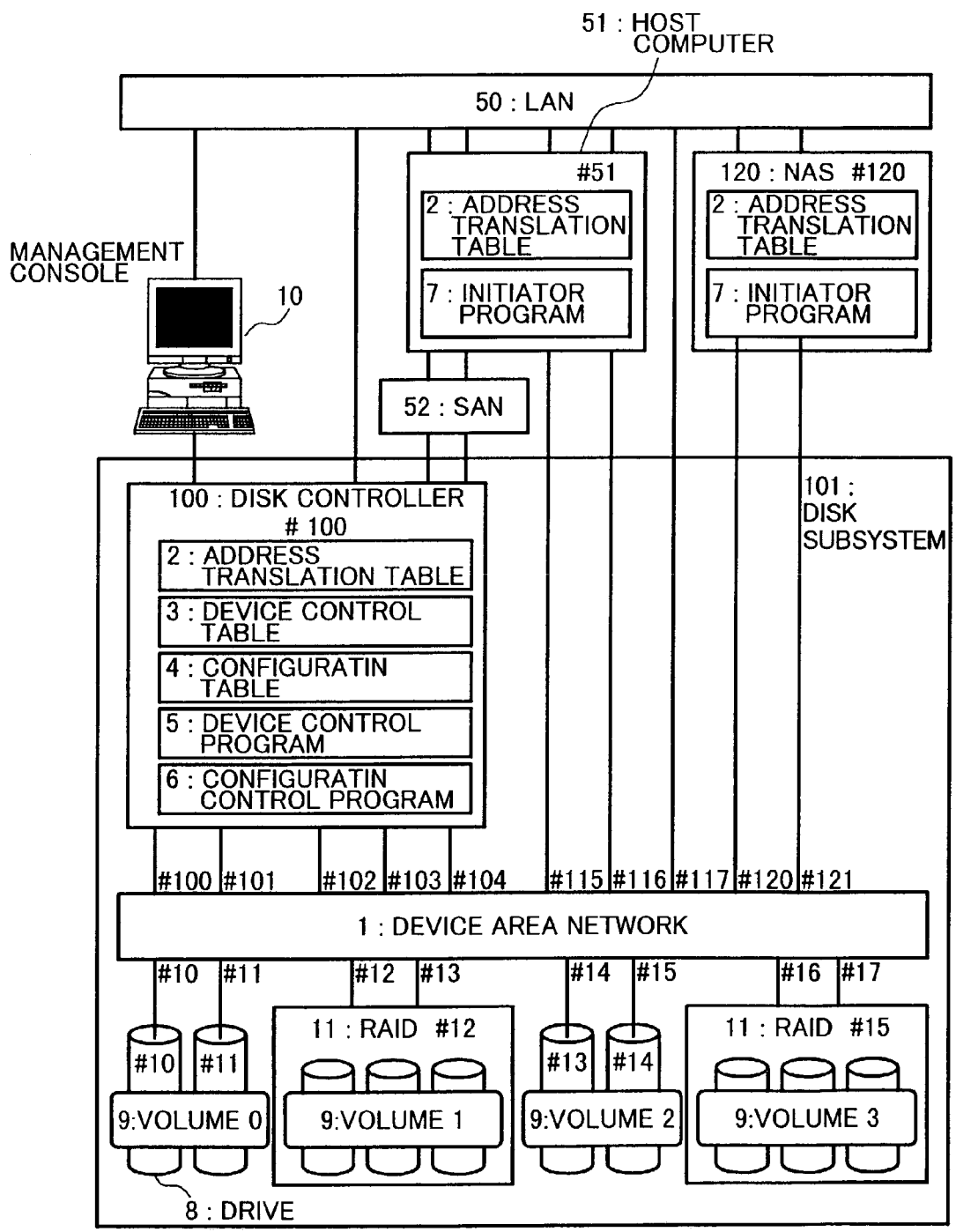
FIG. 16 is a block diagram showing the structure of a storage system configured, according to a preferred Embodiment 3 of the present invention.

A preferred Embodiment 3 of the present invention will be described below, using FIG. 16. This section describes only alterations or additions to Embodiment 1. FIG. 16 is a block diagram showing the structure of a storage system configured, according to Embodiment 3 of the present invention. A feature of Embodiment 3 is directly connecting the disk subsystem 101 and the LAN 50. That is, as shown in FIG. 16, by connecting the LAN 50 to port #17 of the device area network 1, a direct connection is established between the LAN 50 and the disk subsystem 101. Furthermore, the host 51 is provided with an address translation table 2 and a device request program 7 so that it can have direct access to the device area network 1.

<Embodiment 4>

A preferred Embodiment 4 of the present invention will be described below, using FIGS. 17 to 21. This section describes only alterations or additions to Embodiment 1.

Figure 17:
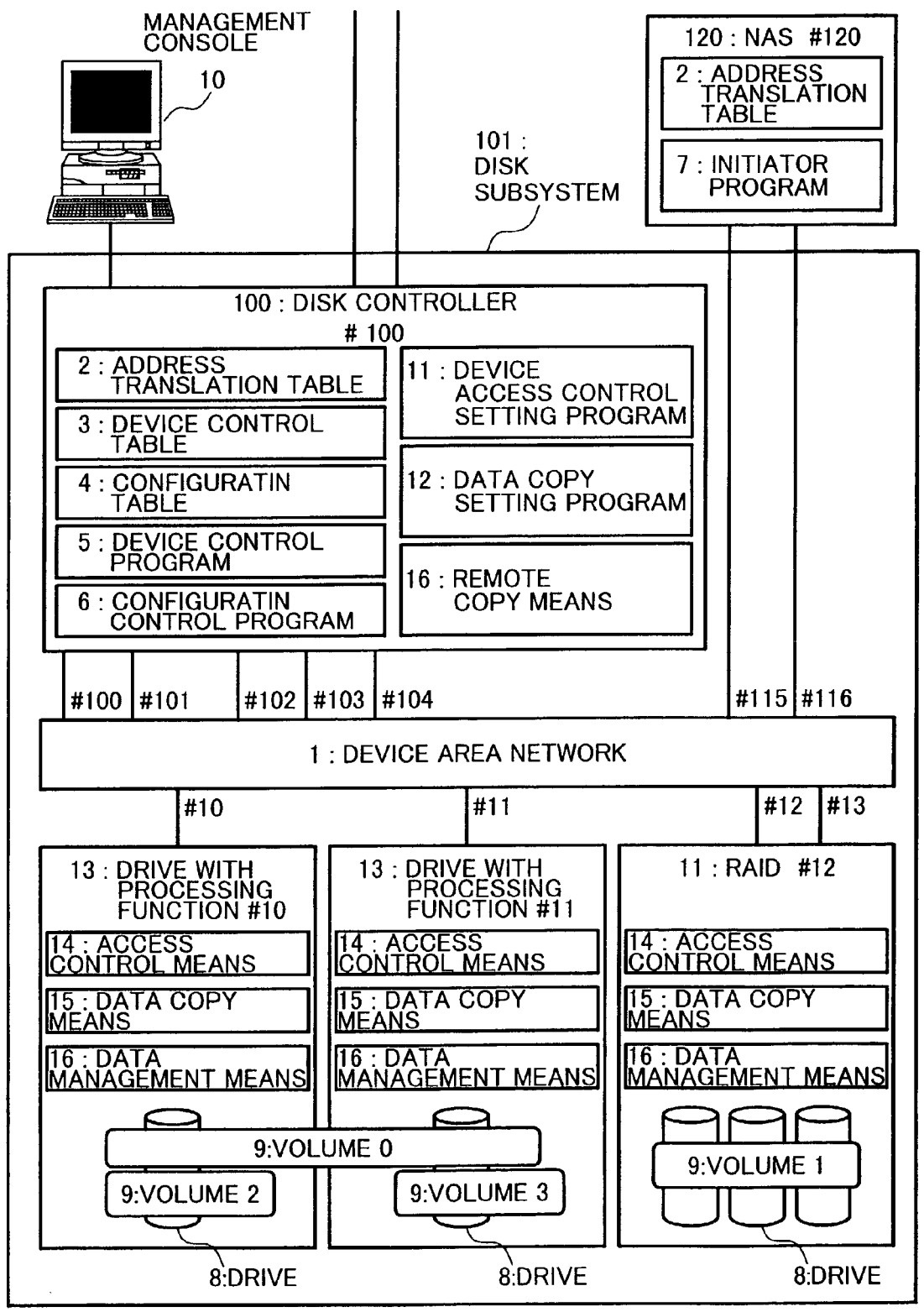
FIG. 17 is a block diagram showing the structure of a storage system configured, according to a preferred Embodiment 4 of the present invention.

FIG. 17 is a block diagram showing the structure of a storage system configured, according to Embodiment 4 of the present invention. As features of Embodiment 4, the disk controller 100 is provided with a device access control setting program 11, data copy setting program 12, and remote copy means 16. Moreover, function-added drives 13 and RAID 11 are employed as storage devices. Each storage device is provided with access control means 14 and data copy means 15. The function-added drives allow for adding diverse functions to normal drives. As an additional function, it is preferable to add data management means 16. Data input/output to/from a conventional drive is performed in units of blocks. When accessing the drive, an external apparatus issues an access request in which a block address of target data on the drive must be specified and accesses the data in units of blocks. The function-added drives 13 provided with the data management means 16 allow for input/output to/from the drives 13 in logical units instead of block units. Industry-standard interfaces for logical units used in files, databases, SQLs, XMLs, and the like may be used. By virtue of the function-added drives 13 provided with the data management means 16, an external apparatus accessing the drives need not be conscious of block addresses depending on the drives and managing the drives becomes easy.

To implement the data management means, essentially, a translation table is required for mapping the logical units used in the above-mentioned data forms to the block addresses of the drives. For such mapping, a translation program should run with a processor and memory. Thus, if there is a set of a processor, memory, translation table, and translation program, the data management means can be implemented on a RAID or the like besides individual drives. As an example of this implementation, the RAID 11 is shown in FIG. 7.

The access control means 14 is a function of judging whether to respond to an incoming access request and responding to only the request from an access permitted apparatus. For example, the access control means controls access such that when the drive receives a read request, it transfers requested data to the requester apparatus only if the apparatus has been set beforehand permitted to access it. In consequence, even if many external apparatuses of different kinds have connected to the device area network 1, exclusive control of access can be exerted and security can be maintained. To implement the access control means 14, essentially, the following are required: a memory for storing device identifiers to which access permission has been granted and means for judging whether the device identifier of the requester apparatus is access permitted when receiving an access request. The device access control setting program 11 sets an external apparatus permitted to access a storage device beforehand.

Details hereof will be described later, using FIG. 18. The data copy means 15 is a function of copying the data in pre-addressed area on a drive to a pre-addressed area on another storage device connected to the device area network 1. It is preferable to implement this function by using a copy command of SCSI. If updates are made to the data in the area on the copy-from-device during a copy, they are applied to the copy-to-device also. The data copy setting program 12 commands a data copy. Details hereof will be described later, using FIGS. 19 and 20. The remote copy means 16 is a function of copying data in the disk subsystem 101 to another disk subsystem that is remotely located in a geographical aspect, using a leased line (not shown) or SAN.

Figure 21:
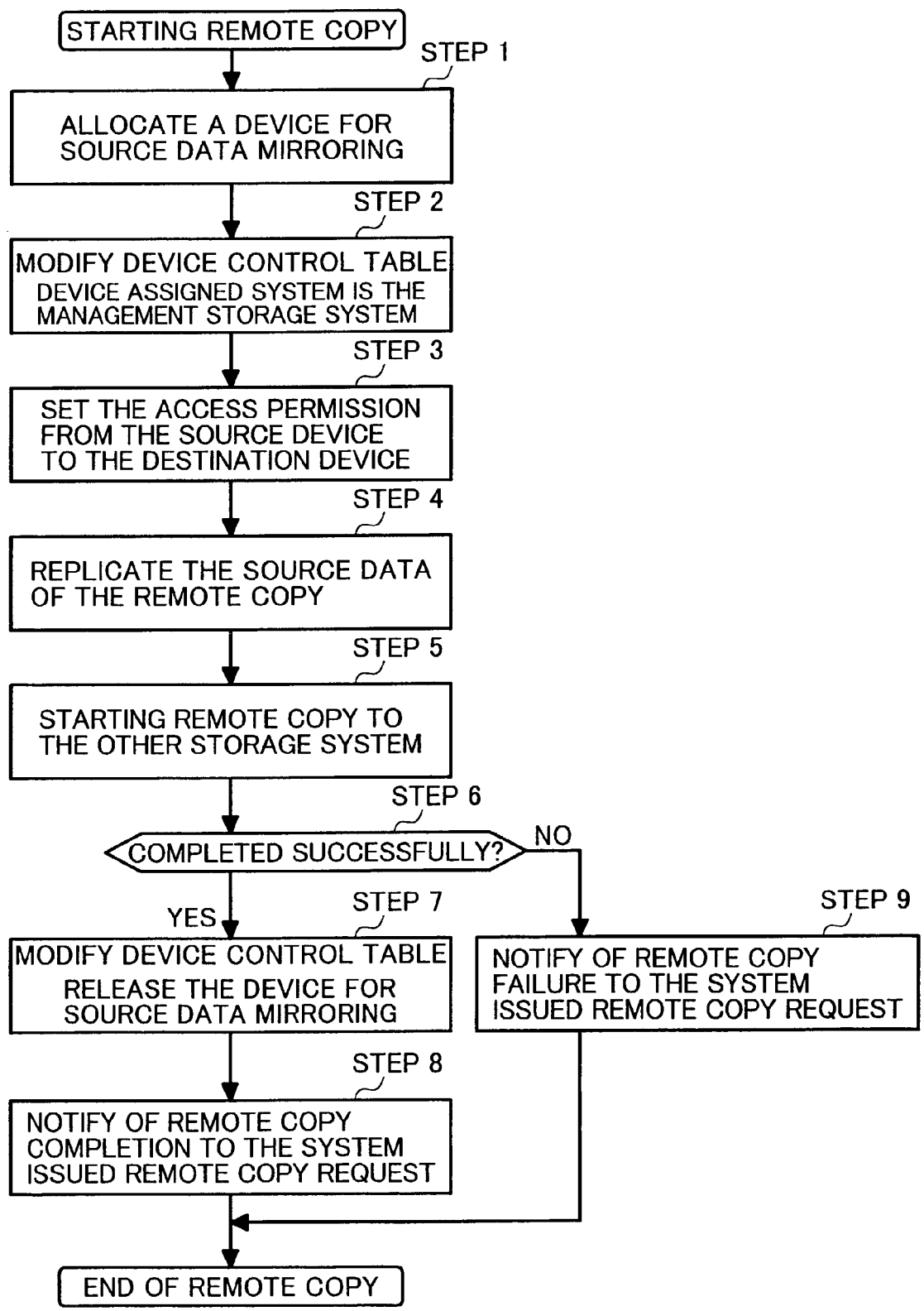
FIG. 21 is a flowchart illustrating a remote copy process.
Figure 22:
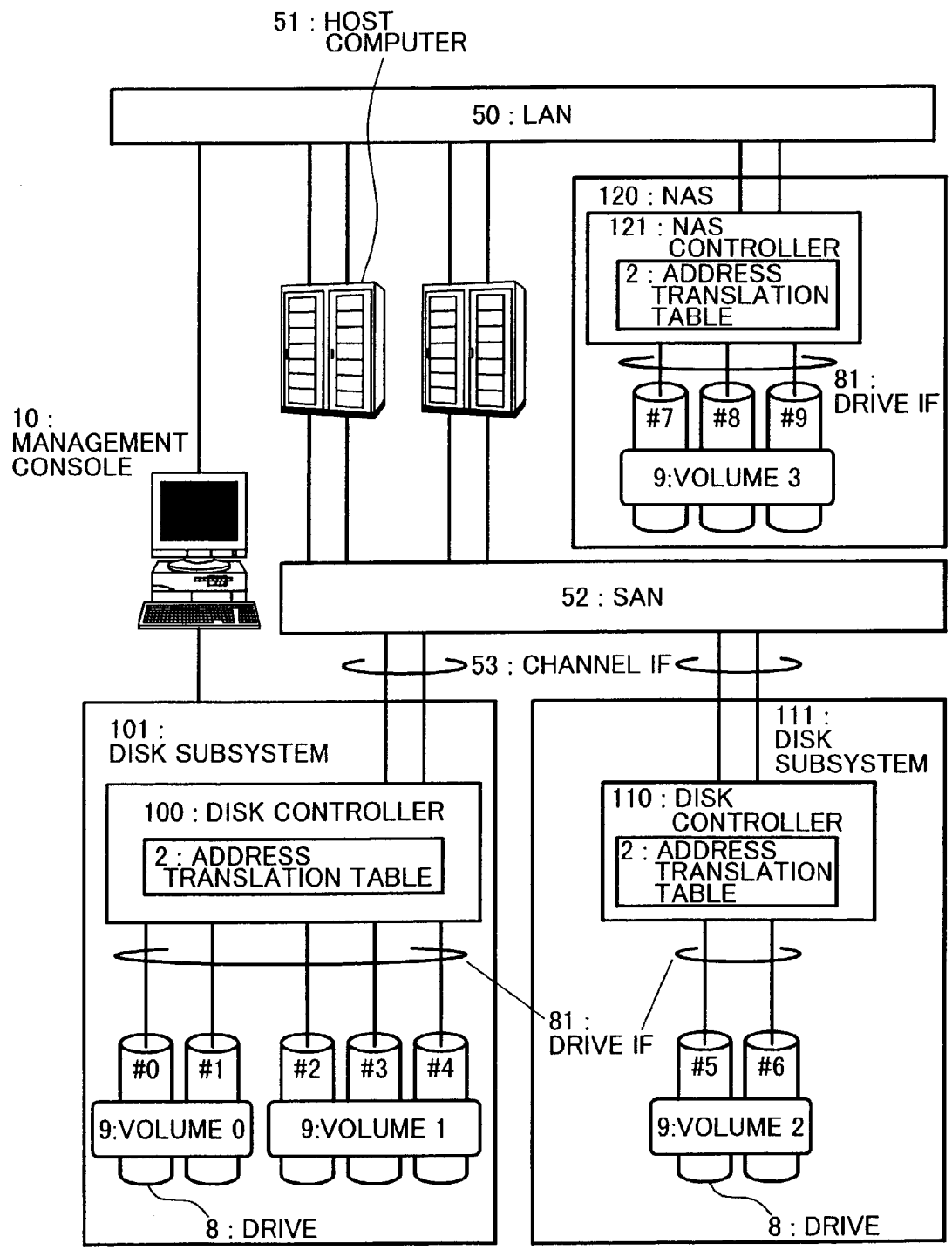
FIG. 22 is a block diagram showing the structure of a storage system configured, according to conventional technique of building a storage system.

Details on the remote copy means 16 will be described later, using FIG. 21.

The operation of the device access setting program 11 will now be described, using FIG. 18. In the procedural embodiment shown in FIG. 18, a step for setting the requester apparatus permitted to access the storage device allocated to it is added to the device allocation process described in FIG. 8.

Figure 18:
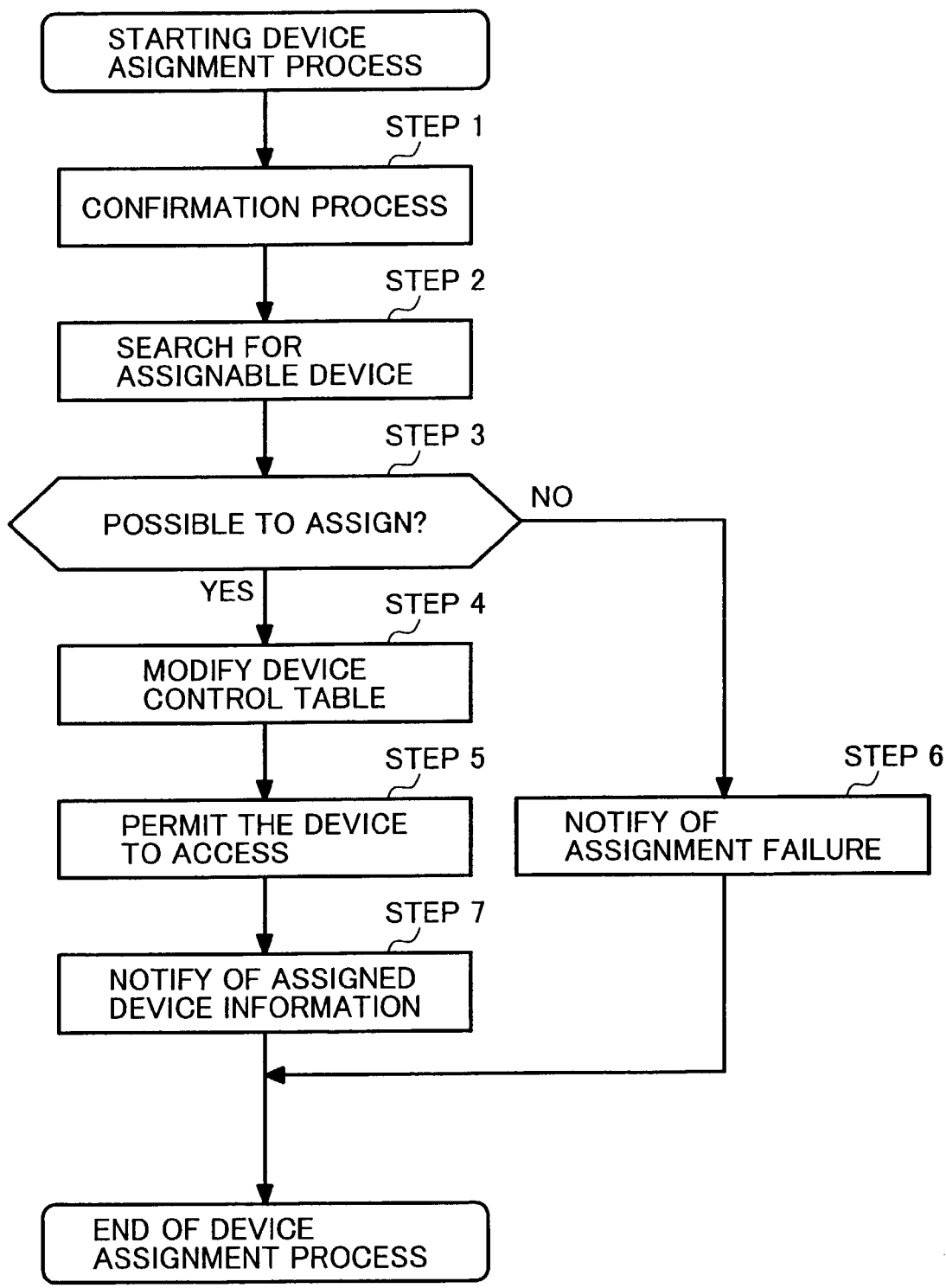
FIG. 18 is a flowchart illustrating an access permission setting process.

In the procedure shown in FIG. 18, step 5 is added to the procedure shown in FIG. 5. In the step 5, after updating the device allocation table to allocate a storage device to the requester apparatus, set the requester apparatus permitted to access the allocated storage device. Specifically, give the device identifier of the requester apparatus to the access control means 14 of the storage device and the access control means sets the apparatus with the device identifier permitted to access the storage device.

First operation of the data copy setting program 12 will now be described, using FIG. 19. In the procedural embodiment shown in FIG. 19, a case where each storage device includes the data copy means is discussed. The function-added drives 13 and the RAID 11 shown in FIG. 17 are available as storage devices. The data copy setting program 12 should be activated by request from an external apparatus to which a storage device is allocated, such as, for example, NAS120, or by the start command input through the administrative console 10.

The program operation is as follows. First, allocate a copy-to-device (step 1). Add the thus allocated device to the device allocation table 3 and set the managing storage system on which the data copy setting program runs for the apparatus to which the device is allocated (step 2). Then, the allocated copy-to-device permitted to access the copy-from-device is set (step 3). Next, the copy-from-device is commanded to copy data in the addressed area on the copy-from-device to the addressed area on the copy-to-device (step 4). By this command, the copy-from-device starts to copy the data. If updates are made to the data in the area on the copy-from-device during the copy, the data updates are applied to the copy-to-device also. Upon the termination of the copy, it is judged whether it is a normal termination (step 5). Upon normal termination, the apparatus is changed to which the copy-to-device is allocated to the device identifier of the copy requester storage system in the device allocation table 3 (step 6). Furthermore, the copy requester apparatus permitted to access the copy-to-device is set (step 7).

The copy requester apparatus is notified of a successful copy and the identifier and port number of the copy-to-device (step 8). In case of copy failure by judgment in step 5, on the other hand, the copy requester apparatus is notified of copy failure (step 9). Then, the copy process terminates.

Figure 20:
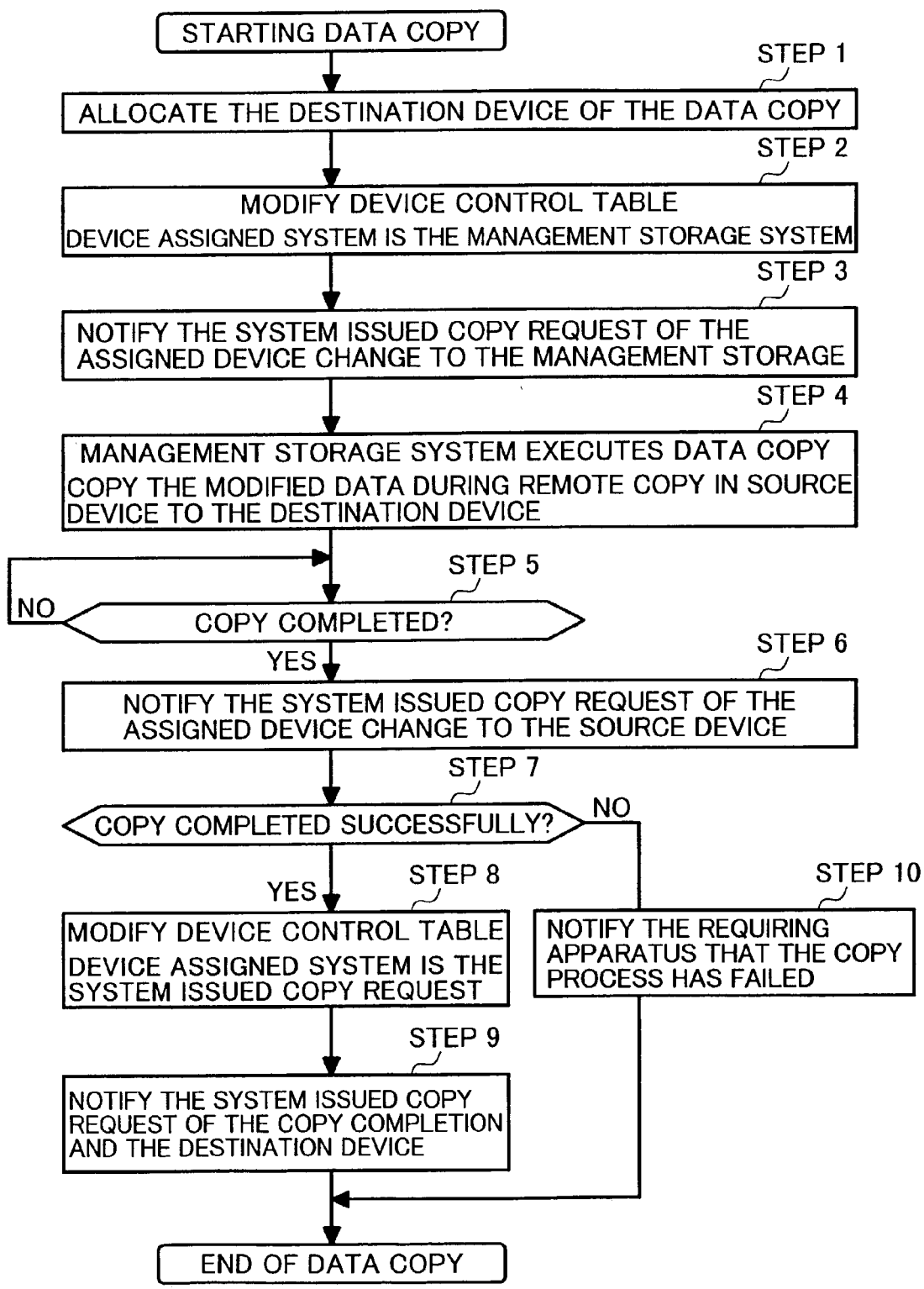
FIG. 20 is another flowchart illustrating a second data copy process.

Second operation of the data copy setting program 12 will now be described, using FIG. 20. In the procedural embodiment shown in FIG. 20, a case where each storage device does not include the data copy means is discussed. The drives 8 shown in FIG. 1 are available as storage devices. In this embodiment, a data copy is executed by the managing storage system on which the data copy setting program 12 runs. Access to the copy-from-data during a copy is performed via the managing storage system and it is possible to apply updates to the above data to both copy-from- and copy-to-devices.

The program operation is as follows. First, a copy-to-device is allocated (step 1). The thus allocated device is added to the device allocation table 3 and the managing storage system on which the data copy setting program runs is set for the apparatus to which the device is allocated (step 2). Then, the copy requester apparatus is notified of changing the allocated device from the copy-from-device to the managing storage system (step 3). Next, the managing storage system executes the copy of addressed data during which updates made to the copy-from-data are applied to the copy-from- and copy-to-devices (step 4).

Then, it is judged whether the copy terminates (step 5). Upon the copy termination, notify the copy requester apparatus of returning the allocated device from the managing storage system to the copy-from-device (step 6). Then, it is judged whether it is a normal termination of copy (step 7). Upon normal termination, the apparatus to which the copy-to-device is allocated is changed to the device identifier of the copy requester apparatus in the device allocation table 3 (step 8). Then, the copy requester apparatus is notified of a successful copy and the identifier and port number of the copy-to-device (step 9).

In case of copy failure by judgment in the step 7, on the other hand, the copy requester apparatus is notified of copy failure (step 10). Then, the copy process terminates. By using the data copy method illustrated in this embodiment, even for storage devices like drives not having the data copy means, data stored on a device can be copied to another device via the managing storage system.

Operation of the remote copy means 16 will now be described, using FIG. 21. A feature of the procedural embodiment shown in FIG. 21 is implementing a remote copy to an external apparatus not having remote copy means, using the remote copy means of the managing storage system.

The operation is as follows. First, a device for mirroring data to be remotely copied is allocated (step 1). Then, the thus allocated device is added to the device allocation table 3 and set the managing storage system for the apparatus to which the device is allocated (step 2). The allocated device permitted to access the copy-from-device is set (step 3). The data to be remotely copied is mirrored (step 4).

Figure 19:
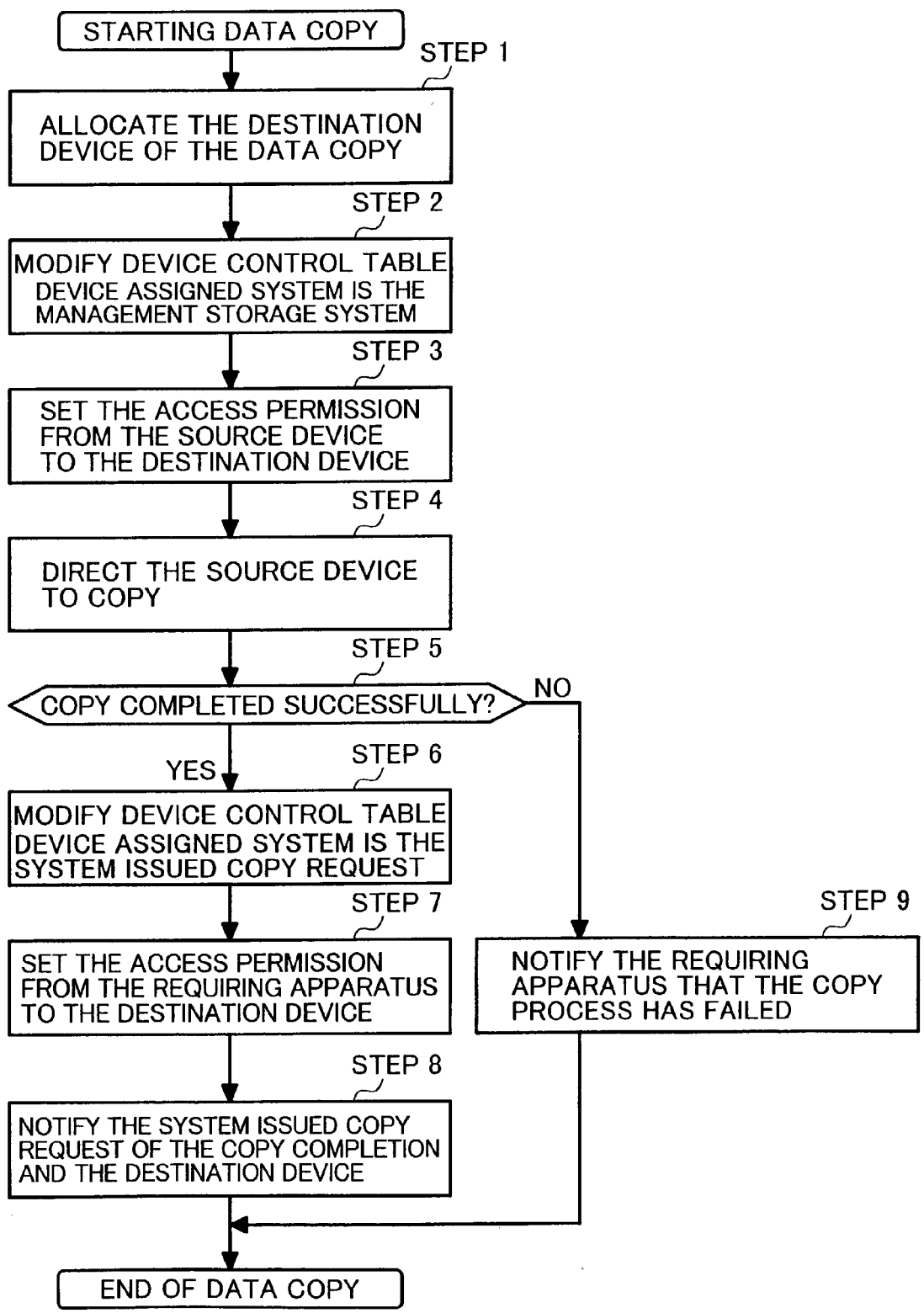
FIG. 19 is a flowchart illustrating a first data copy process.

Mirroring should be performed, using the data copy function explained for FIG. 19. After the completion of the mirroring, a remote copy to another storage system is started (step 5). Then, normal termination is awaited (step 6). Upon normal termination, the device for mirroring that has been allocated for the remote copy in the device allocation table 3 is deallocated (step 7). To deallocate the device, the setting in the "device identifier to which storage device is allocated" column field is changed for the device to NO. At the same time, the device not permitted to access the copy-from-device is set for the allocated device set permitted to access it in the step 3. Furthermore, the requester apparatus is notified of a successful remote copy (step 8). If normal terminal does not occur in the step 6, on the other hand, the requester apparatus is notified of remote copy failure (step 9). Then, the remote copy process terminates. Other features of the present invention are recited below:

The present invention offers a method for managing a storage system that comprises a plurality of storage devices and a managing apparatus for managing the plurality of storage devices, the plurality of storage devices and the managing apparatus being connected via a network or a switch, the method in which the managing apparatus is provided with a device allocation table containing information about the allocation of the storage devices to the managing apparatus or external apparatuses that can use the storage devices, receives a request to allocate one or more storage devices to an external apparatus that needs to use storage devices and connects to the network or switch, allocates the one or more storage devices to the external apparatus by referring to the device allocation table, and updates the device allocation table.

The foregoing method for managing the storage system, wherein the request to allocate one or more storage devices is issued from the administrative console of the storage system.

The present invention offers a method for managing a storage system comprising a plurality of storage devices and a managing apparatus for managing the plurality of storage devices, the plurality of storage devices and the managing apparatus being connected via a network or a switch, the method in which the managing apparatus is provided with a configuration table containing information about the connection of the storage devices and the managing apparatus or external apparatuses that can use the storage devices to the network or switch and manages the connection states of the storage devices and the managing apparatus or external apparatuses that can use the storage devices connected to the network or switch.

The present invention offers a method for managing a storage system comprising a plurality of storage devices provided with access control means and a managing apparatus for managing the plurality of storage devices, the plurality of storage devices and the managing apparatus being connected via a network or a switch, the method in which the managing apparatus is provided with a device allocation table containing information about the allocation of the storage devices to the managing apparatus or external apparatuses that can use the storage devices, allocates one or more storage devices in the storage system to an external apparatus that needs to use storage devices and connect to the network or switch, instructs the access control means of the storage device or devices to permit access from the external apparatus to which the storage device or devices have been allocated, and the storage device or devices will respond to access requests from only the external apparatus permitted for access thereto.

The present invention offers a method for managing a storage system comprising a plurality of storage devices and a managing apparatus for managing the plurality of storage devices, the plurality of storage devices and the managing apparatus being connected via a network or a switch, the storage devices including means for copying local data to another storage device connected to the network or switch and means for applying data updates made during copy operation to the copy-to-storage-device also, the method in which the managing apparatus instructs one of the storage devices to copy its local data to another storage device.

The present invention offers a method for managing a storage system comprising a plurality of storage devices and a managing apparatus for managing the plurality of storage devices, the plurality of storage devices and the managing apparatus being connected via a network or a switch, the managing apparatus including means for copying data stored on one of the storage devices to another storage device connected to the network or switch and means for applying data updates made during copy operation to copy-from- and copy-to-storage-devices, the method in which the managing apparatus performs the steps of:

prior to the start of a copy, notifying an external apparatus that can use some of the storage devices and connects to the network or switch and that to which the copy-from-storage-device is allocated that the allocated storage device changes from the copy-from-storage-device to the managing apparatus;

copying the data from the copy-from-storage-device to the copy-to-storage-device;

applying updates made to the copy-from-data during the copy to the copy-from-storage-device and the copy-to-storage-device; and after the completion of the copy, notifying the external apparatus that can use some of the storage devices and that to which the copy-from-storage-device was allocated that the allocated storage device changes from the managing apparatus to the copy-from-storage-device.

The present invention offers a method for managing a storage system comprising a plurality of storage devices and a managing apparatus for managing the plurality of storage devices, the plurality of storage devices and the managing apparatus being connected via a network or a switch, the managing apparatus including means for remotely copying data stored on a storage device connected to the network or switch to a second remote storage system, the method in which the managing apparatus copies the data stored on a storage device connected to the network or switch, which has been allocated to an external apparatus that can use some of the storage devices and connects to the network or switch, to another storage device connected to the network or switch, and then remotely copies the copied data to the second remote storage system.

According to the present invention, a storage system is configured with a plurality of storage devices connected to the storage system via a network. The storage system enables an external storage system to connect to the network and use the storage devices. The storage system is capable of consolidated management of a great number of storage devices and consequently the management cost can be reduced.

Integration of drives which were, however, conventionally distributed and located across a plurality of storage systems can be achieved by the invention, so that effective use of the drives is possible.

The storage system can be embodied to have means for judging whether an external apparatus has access permission when attempting access to a storage device in the system. In this embodiment, the storage system that manages allocating the storage devices in the system is able to grant access permission to an external apparatus that issued a request to use a storage device and then allocate the storage device to the apparatus, and, at the same time, block access from an external apparatus not having access permission.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

While the present invention has been described above in connection with the preferred embodiments, one of ordinary skill in the art would be motivated by this disclosure to make various modifications and still be within the scope and spirit of the present invention as recited in the appended claims.

What is claimed is:

1. A storage system comprising:
    a plurality of storage devices and a managing apparatus for managing the plurality of storage devices, the plurality of storage devices and the managing apparatus being connected via a network,
    a channel interface allowing an external apparatus to access a storage device via the managing apparatus; and
    an interface allowing the external apparatus to access a storage device via the network,
    wherein said managing apparatus comprises a device allocation table which contains information regarding the allocation of the storage device to the managing apparatus and the external apparatus and a configuration table containing information about the connection of the storage device to the managing apparatus and the external apparatus, and
    wherein, in response to a device allocation request from a requesting apparatus specifying allocation conditions, another storage device which satisfies the allocation conditions is allocated to the requesting apparatus and the device allocation table is updated to reflect such allocation.

2. A storage system according to claim 1, wherein the network is a switch.

3. A storage system according to claim 1, wherein the storage devices are comprised of a plurality of drives, and the storage system is one of a disk subsystem and a network attached storage (NAS) connected to a LAN.

4. A storage system according to claim 1, further comprising:
    data management means installed in the plurality of storage devices for translating logical units for access into block units for access.

5. A storage system comprising a plurality of storage devices and a managing apparatus for managing the plurality of storage devices, the plurality of storage devices and the managing apparatus being connected via a network, wherein
    the managing apparatus is provided with a LAN interface allowing an external apparatus to access a storage device via the managing apparatus, and
    the network is provided with a LAN interface allowing the external apparatus to access a storage device via the network,
    said managing apparatus comprises a device allocation table which contains information regarding the allocation of the storage device to the managing apparatus and the external apparatus and a configuration table containing information about the connection of the storage device to the managing apparatus and the external apparatus, and
    in response to a device allocation request from a requesting apparatus specifying allocation conditions, another storage device which satisfies the allocation conditions is allocated to the requesting apparatus and the device allocation table is updated to reflect such allocation.

6. A storage system according to claim 5, wherein the network is a switch.

7. A storage system according to claim 5, further comprising:
    data management means installed in the plurality of storage devices for translating logical units for access into block units for access.

8. A storage system comprising:
    a plurality of disk controllers;
    a plurality of storage devices; and
    a network interconnecting the plurality of disk controllers and the plurality of storage devices,
    wherein at least one storage device of the storage system can be directly accessed by another storage system,
    wherein the plurality of disk controllers include address translation tables for mapping addresses corresponding to actual addresses of the storage devices, device allocation tables listing the allocation of each storage device and a configuration table defining a current system configuration of connection between the plurality of storage devices and the network, and
    wherein, in response to a device allocation request from a requesting apparatus specifying allocation conditions, another storage device which satisfies the allocation conditions is allocated to the requesting apparatus and at least one of the device allocation tables is updated to reflect such allocation.

9. The storage system according to claim 8, wherein the disk controller further comprises a device control program which is executed for allocating said another device and a configuration control program which is executed for connecting to said another device to the network.

10. The storage system according to claim 8, wherein the network is one of a switch and a local area network (LAN).

11. A storage system comprising a plurality of storage devices and a managing apparatus for managing the plurality of storage devices, the plurality of storage devices and the managing apparatus being connected via a network or a switch, wherein:
    the managing apparatus is provided with a channel interface allowing an external apparatus that can use some of the storage devices to access a storage device via the managing apparatus,
    the network or switch is provided with an interface allowing the external apparatus that can use some of the storage devices to access a storage device via the network or switch,
    said managing apparatus comprises a device allocation table which contains information regarding the allocation of at least one of the storage devices to the managing apparatus and the external apparatus and a configuration table containing information about the connection of the at least one storage device to the managing apparatus and the external apparatus, and
    in response to a device allocation request from a requesting apparatus specifying allocation conditions, another storage device which satisfies the allocation conditions is allocated to the requesting apparatus and the device allocation table is updated to reflect such allocation.

12. A storage system according to claim 11, wherein:
the storage devices are drives or disk arrays, each consisting of a plurality of drives, and the storage system is a disk subsystem or network attached storage (NAS) connected to a LAN.

13. A storage system according to claim 11, wherein:
the plurality of storage devices include data management means for translating logical units to access into block units to access.

14. A storage system comprising a plurality of storage devices and a managing apparatus for managing the plurality of storage devices, the plurality of storage devices and the managing apparatus being connected via a network or a switch, wherein:
the managing apparatus is provided with a LAN interface allowing an external apparatus that can use some of the storage devices to access a storage device via the managing apparatus, and
the network or switch is provided with a LAN interface allowing an external apparatus that can use some of the storage devices to access the storage device via the network or switch
wherein said managing apparatus comprises a device allocation table which contains information regarding the allocation of the storage device to the managing apparatus and the external apparatus and a configuration table containing information about the connection of the storage device to the managing apparatus and the external apparatus, and
wherein, in response to a device allocation request from a requesting apparatus specifying allocation conditions, another storage device which satisfies the allocation conditions is allocated to the requesting apparatus and the device allocation table is updated to reflect such allocation.

* * * * *